US009100189B2

(12) United States Patent
Hartley et al.

(10) Patent No.: US 9,100,189 B2
(45) Date of Patent: *Aug. 4, 2015

(54) SECURE PROVISIONING IN AN UNTRUSTED ENVIRONMENT

(71) Applicants: David H. Hartley, Seaview Downs (AU); Thomas E. Tkacik, Phoenix, AZ (US); Carlin R. Covey, Tempe, AZ (US); Lawrence L. Case, Austin, TX (US); Rodney D. Ziolkowski, Austin, TX (US)

(72) Inventors: David H. Hartley, Seaview Downs (AU); Thomas E. Tkacik, Phoenix, AZ (US); Carlin R. Covey, Tempe, AZ (US); Lawrence L. Case, Austin, TX (US); Rodney D. Ziolkowski, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/971,886

(22) Filed: Aug. 21, 2013

(65) Prior Publication Data
US 2014/0164779 A1    Jun. 12, 2014

Related U.S. Application Data

(63) Continuation-in-part of application No. 13/601,993, filed on Aug. 31, 2012.

(51) Int. Cl.
*H04L 29/06* (2006.01)
*H04L 9/32* (2006.01)
(Continued)

(52) U.S. Cl.
CPC ............. *H04L 9/3247* (2013.01); *G09C 1/00* (2013.01); *H04L 9/0866* (2013.01); *G06F 21/57* (2013.01); *H04L 9/0861* (2013.01); *H04L 9/3271* (2013.01); *H04L 63/12* (2013.01); *H04L 2209/12* (2013.01)

(58) Field of Classification Search
CPC ... H04L 63/0823; H04L 63/12; H04L 63/126; H04L 9/08; H04L 9/0861; H04L 9/0866; H04L 9/0869; H04L 9/30; H04L 9/3247; H04L 9/3249; H04L 9/3263; H04L 9/3271; H04L 2209/12; G06F 21/70–21/72; G06F 21/64; G06F 21/60; G06F 21/57; G06F 21/572; G06F 21/575; G06F 21/10; G09C 1/00
USPC ......... 713/155–157, 164, 168, 172–173, 176, 713/180, 187, 191, 193–194
See application file for complete search history.

(56) References Cited

U.S. PATENT DOCUMENTS 6,026,163 A    2/2000  Micali
6,285,991 B1   9/2001  Powar
(Continued)

FOREIGN PATENT DOCUMENTS

JP    H11239124 A1   8/1999
JP    2004172865 A1  6/2004

OTHER PUBLICATIONS

CERTICOM, "Certicom Security for Silicon Design Protection", Solution Sheet, Jul. 2006, pp. 1-2.
(Continued)

*Primary Examiner* — Eleni Shiferaw
*Assistant Examiner* — Hilary Branske
(74) *Attorney, Agent, or Firm* — Sherry W. Schumm

(57) ABSTRACT

Embodiments include methods for securely provisioning copies of an electronic circuit. A first entity embeds one or more secret values into copies of the circuit. A second entity: 1) embeds a trust anchor in a first copy of the circuit; 2) causes the circuit to generate a message signing key pair using the trust anchor and the embedded secret value(s); 3) signs provisioning code using a code signing private key; and 4) sends a corresponding code signing public key, the trust anchor, and the signed provisioning code to a third entity. The third entity embeds the trust anchor in a second copy of the circuit and causes the circuit to: 1) generate the message signing private key; 2) verify the signature of the signed provisioning code using the code signing public key; and 3) launch the provisioning code on the circuit.

20 Claims, 32 Drawing Sheets

(51) Int. Cl.
*G09C 1/00* (2006.01)
*H04L 9/08* (2006.01)
*G06F 21/57* (2013.01)

(56) References Cited

U.S. PATENT DOCUMENTS

| | | | |
|---|---|---|---|
| 6,711,263 | B1 | 3/2004 | Nordenstam et al. |
| 6,970,562 | B2 | 11/2005 | Sandhu et al. |
| 7,017,041 | B2 | 3/2006 | Sandhu et al. |
| 7,424,610 | B2 | 9/2008 | Ranganathan |
| 7,630,493 | B2 | 12/2009 | Sandhu et al. |
| 7,685,424 | B2 | 3/2010 | Walmsley et al. |
| 7,734,915 | B2 | 6/2010 | Neill et al. |
| 7,895,437 | B2 | 2/2011 | Ganesan et al. |
| 2002/0078346 | A1 | 6/2002 | Sandhu et al. |
| 2003/0159036 | A1 | 8/2003 | Walmsley et al. |
| 2003/0174840 | A1 | 9/2003 | Bogan |
| 2006/0101288 | A1 | 5/2006 | Smeets et al. |
| 2008/0044026 | A1* | 2/2008 | Walters et al. ............... 380/277 |
| 2009/0132830 | A1 | 5/2009 | Haga |
| 2010/0199077 | A1* | 8/2010 | Case et al. ..................... 713/1 |
| 2010/0205433 | A1 | 8/2010 | Neill et al. |
| 2011/0010770 | A1 | 1/2011 | Smith et al. |
| 2013/0080764 | A1* | 3/2013 | Khosravi et al. ............. 713/150 |
| 2014/0064480 | A1 | 3/2014 | Hartley et al. |
| 2014/0068246 | A1 | 3/2014 | Hartley et al. |
| 2014/0205092 | A1 | 7/2014 | Hartley et al. |

OTHER PUBLICATIONS

CERTICOM, "Defending Against Grey-market Fraud", Studies in Self-Defense: A Certicome Application Note Series, Working Paper, Oct. 2008, pp. 1-4.

Rawlings, C., "Product Authentication Certicom AMS", Certicom Corporation, Information Management Workshop, Feb. 17-18, 2009, pp. 1-14.

U.S. Appl. No. 13/601,987, Office Action—Rejection, mailed Jan. 30, 2014.

U.S. Appl. No. 14/220,507, Office Action—Rejection, mailed Jul. 8, 2014.

U.S. Appl. No. 13/601,993, Office Action—Rejection, mailed Sep. 26, 2014.

U.S. Appl. No. 14/571,637, filed Dec. 16, 2014, entitled "Systems and Methods for Secure Provisioning of Production Electronic Circuits".

Final Rejection mailed Oct. 31, 2014 for U.S. Appl. No. 13/601,987, 14 pages.

Notice of Allowance mailed Feb. 17, 2015 for U.S. Appl. No. 13/601,987, 12 pages.

Restriction Requirement mailed Jun. 26, 2014 for U.S. Appl. No. 13/601,987, 7 pages.

Notice of Allowance mailed Feb. 20, 2015 for U.S. Appl. No. 14/220,507, 10 pages.

Restriction Requirement mailed Jun. 6, 2014 for U.S. Appl. No. 13/601,993, 7 pages.

\* cited by examiner

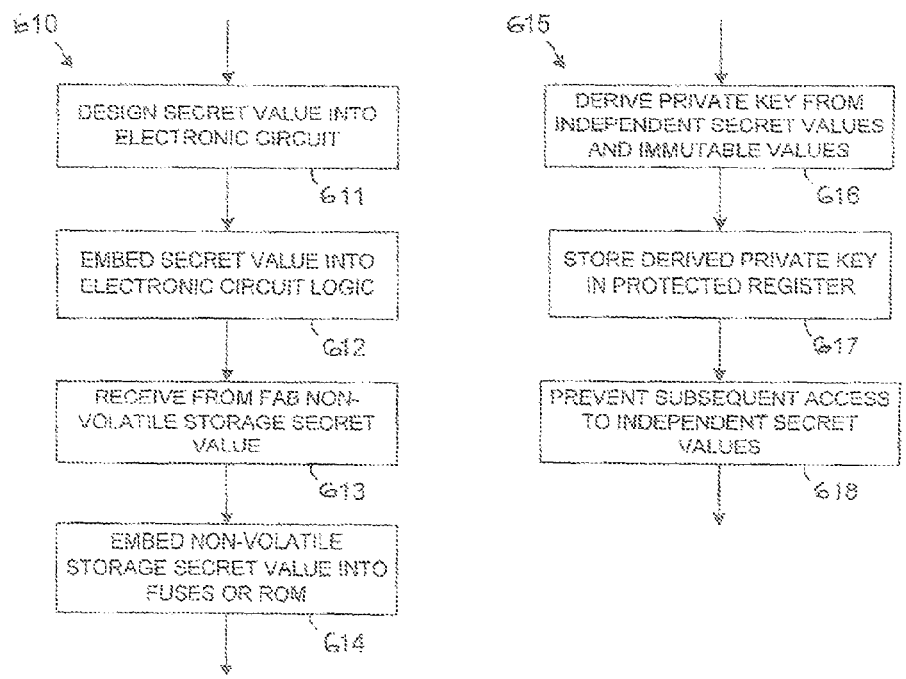
FIG. 6.1

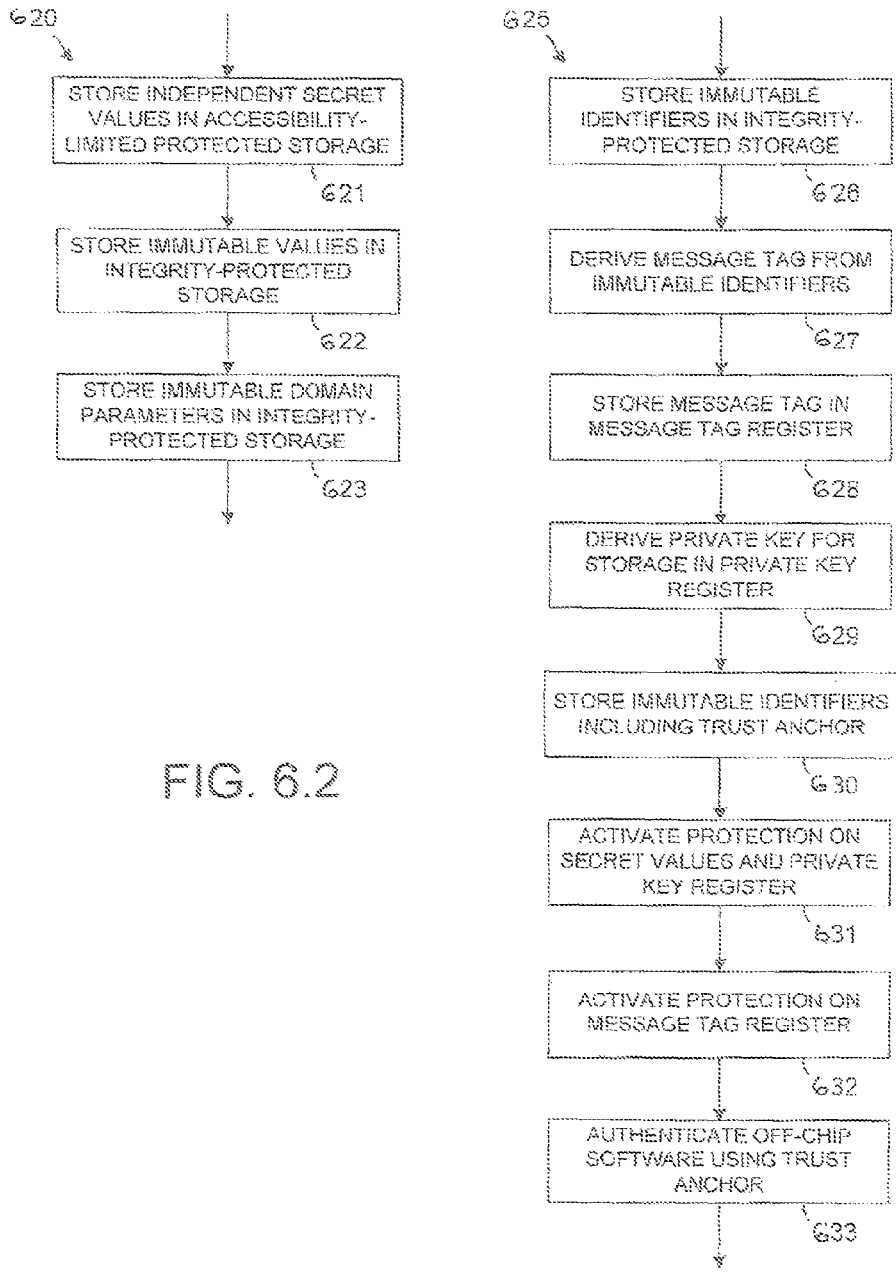
FIG. 6.2

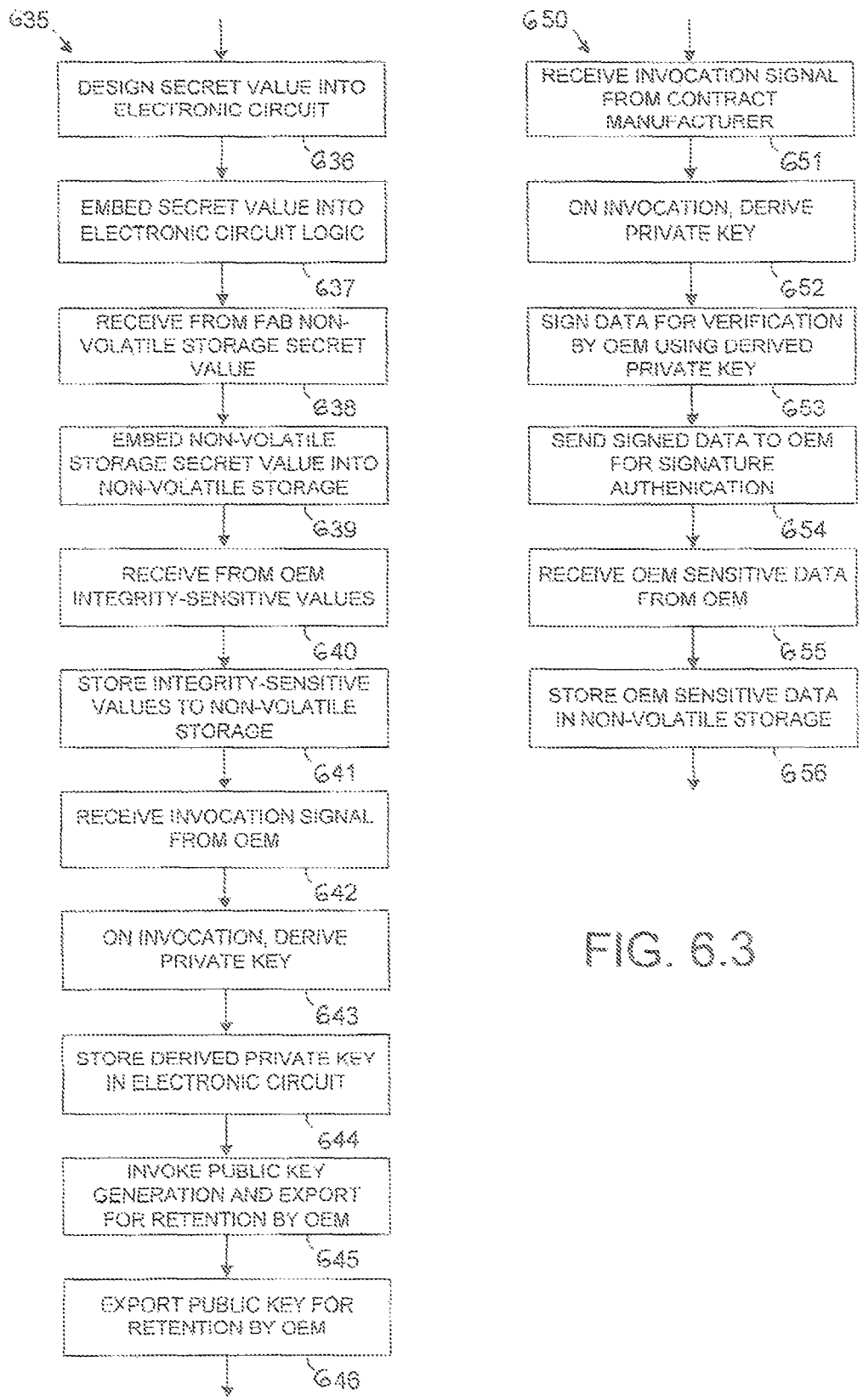
FIG. 6.3

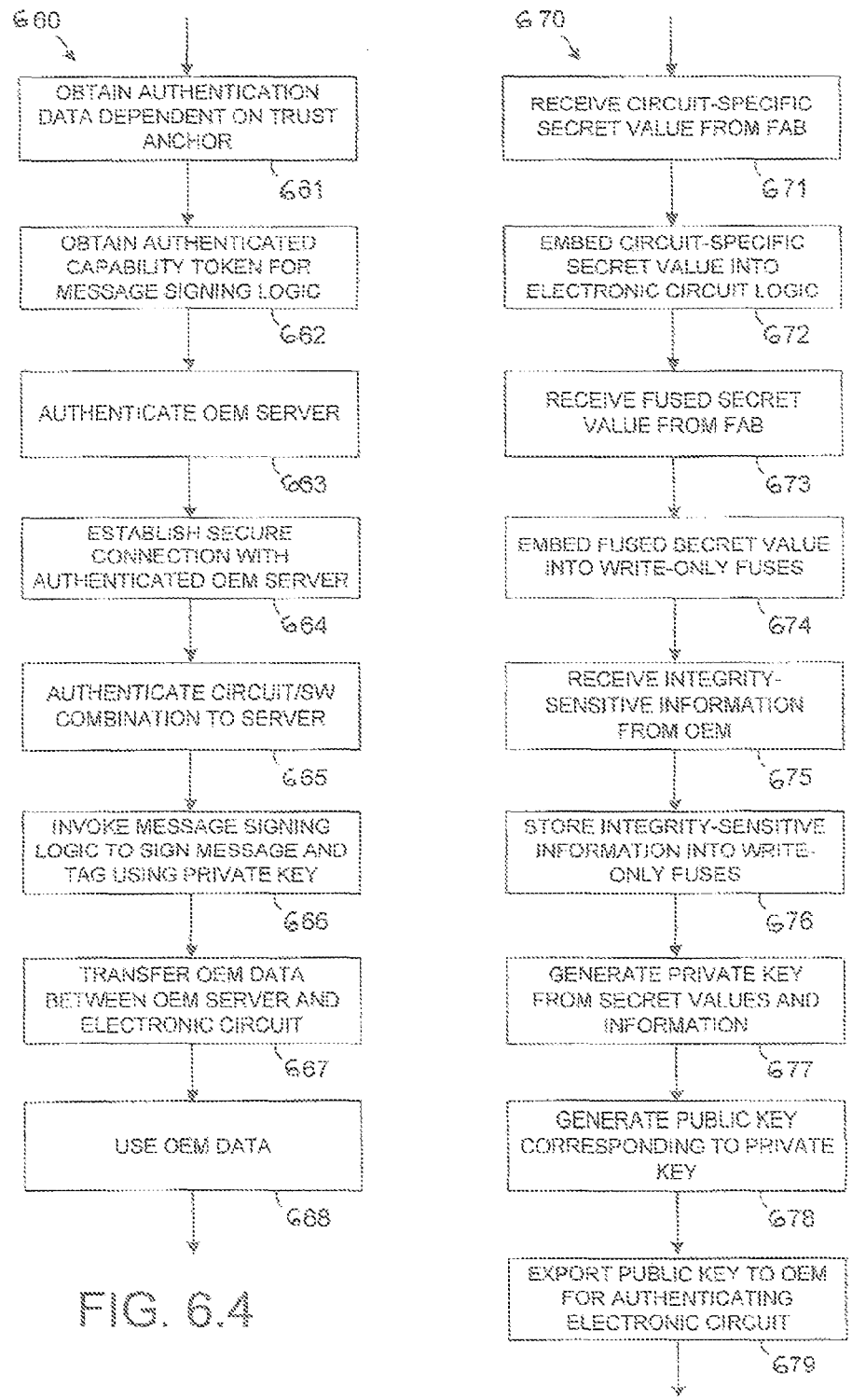
FIG. 6.4

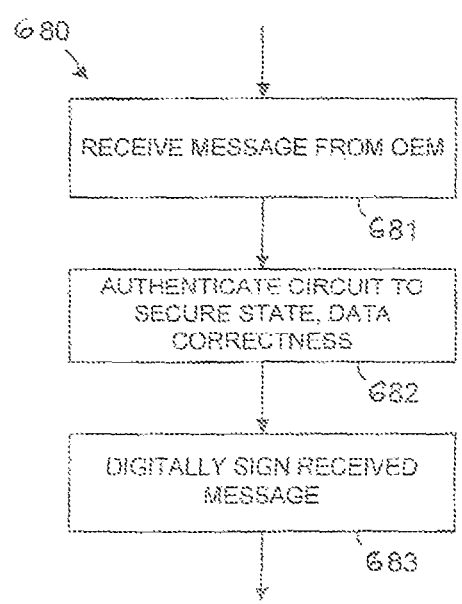
FIG. 6.5

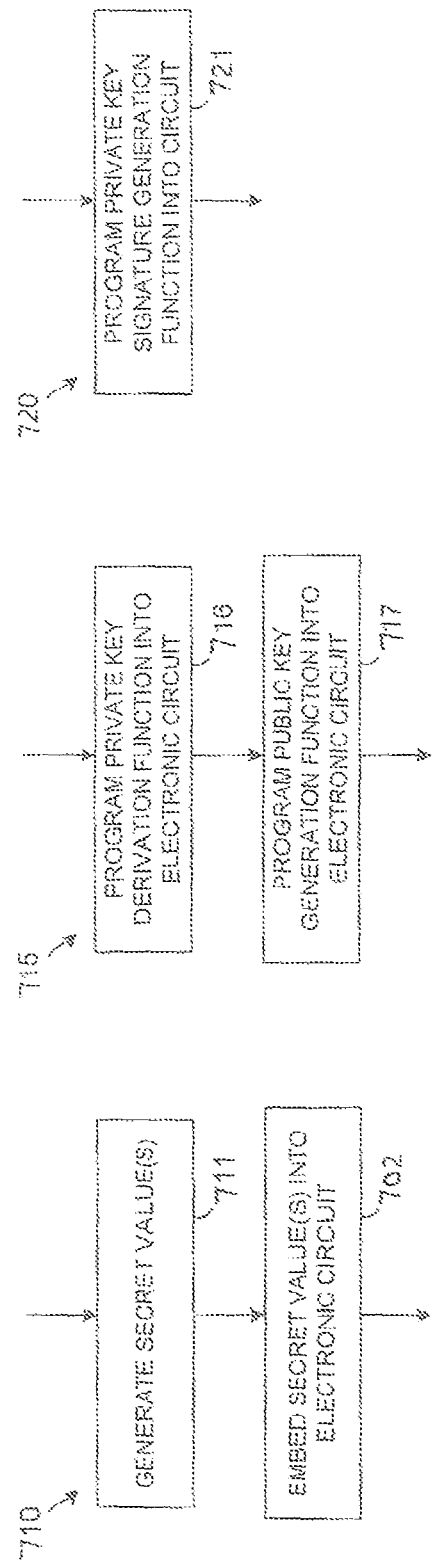
FIG. 7.1

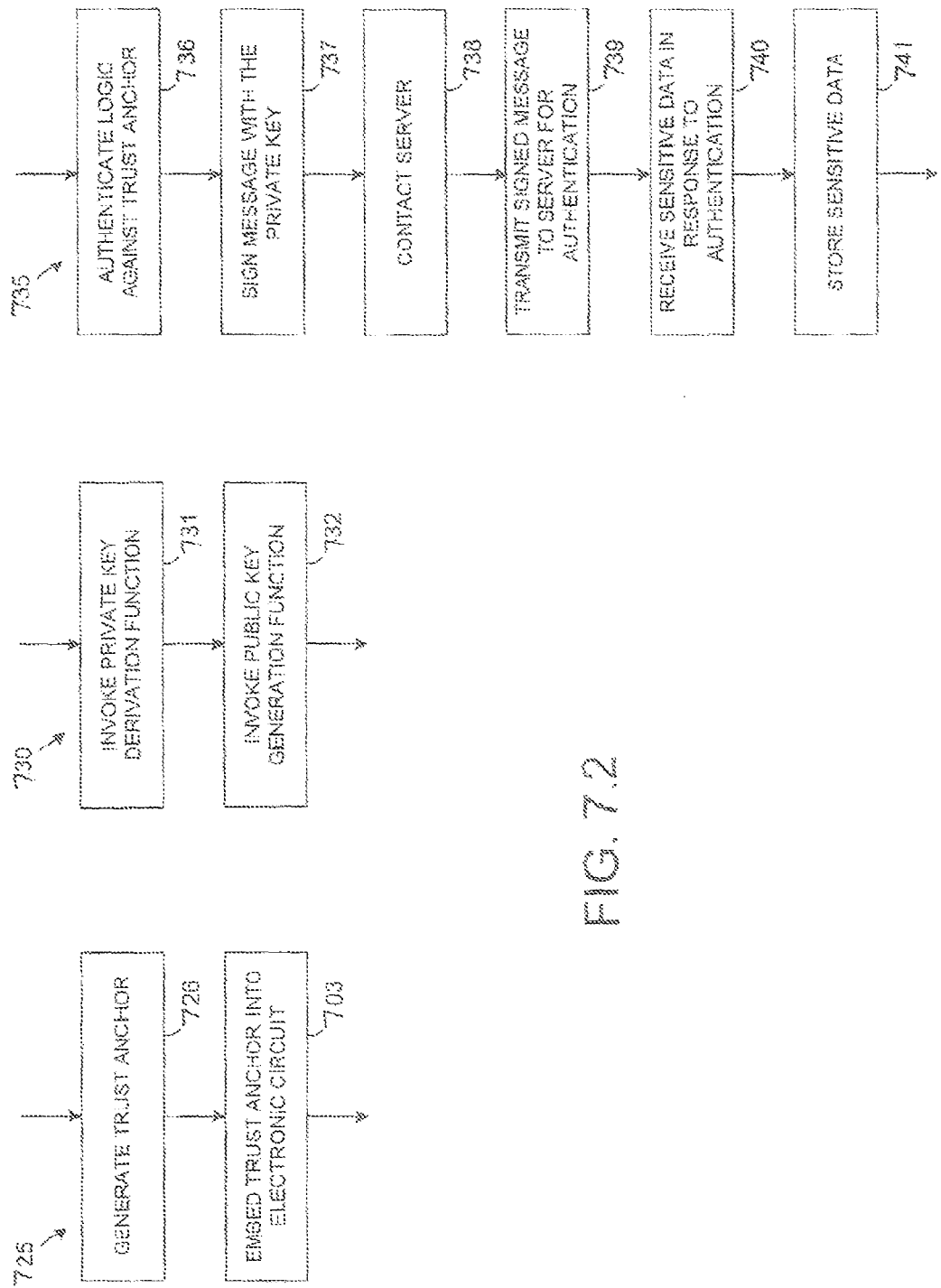
FIG. 7.2

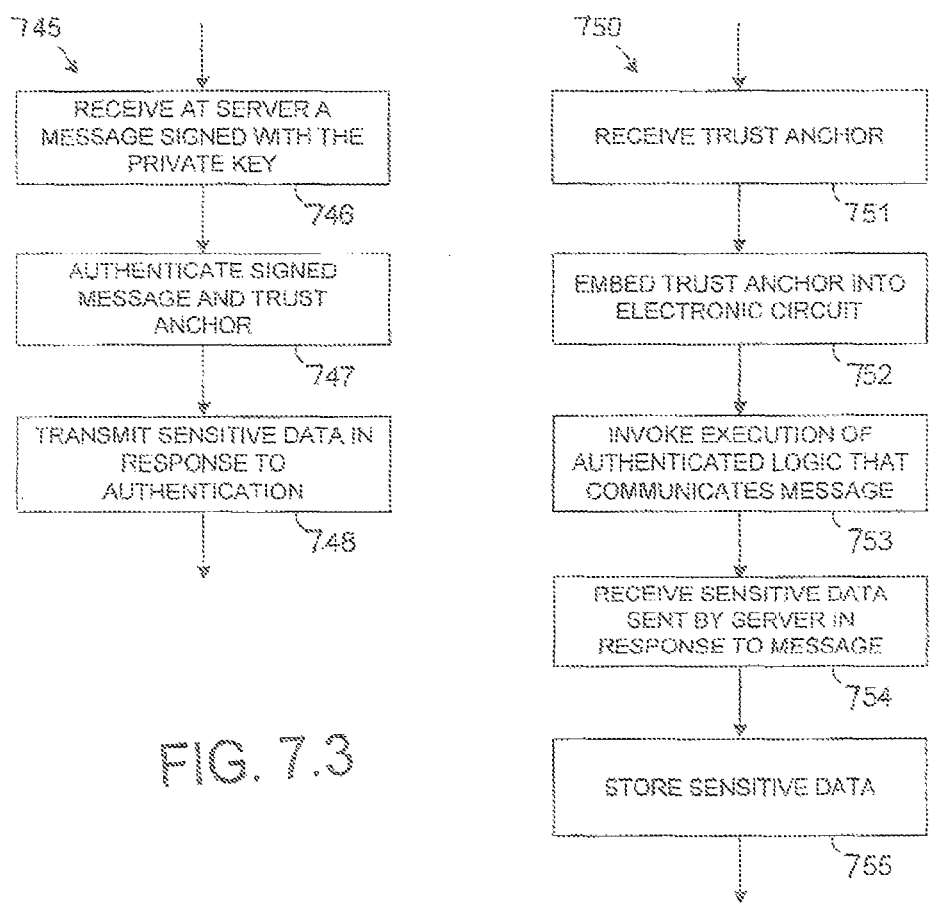
FIG. 7.3

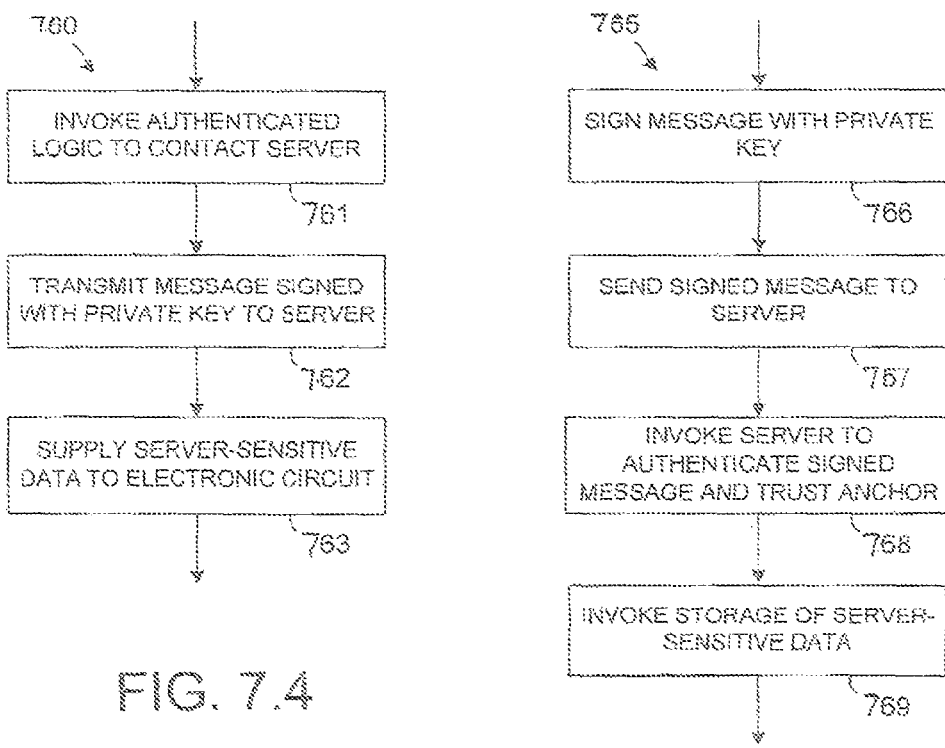
FIG. 7.4

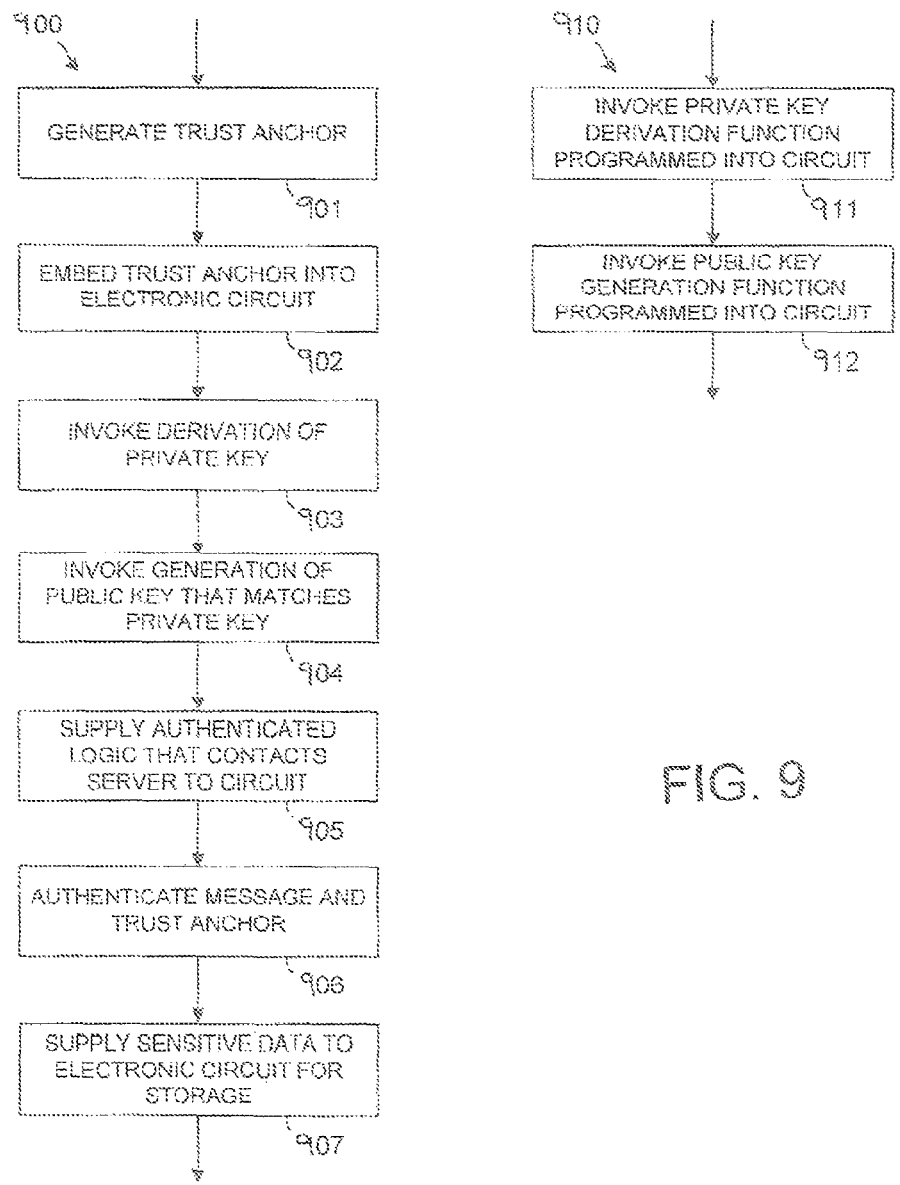

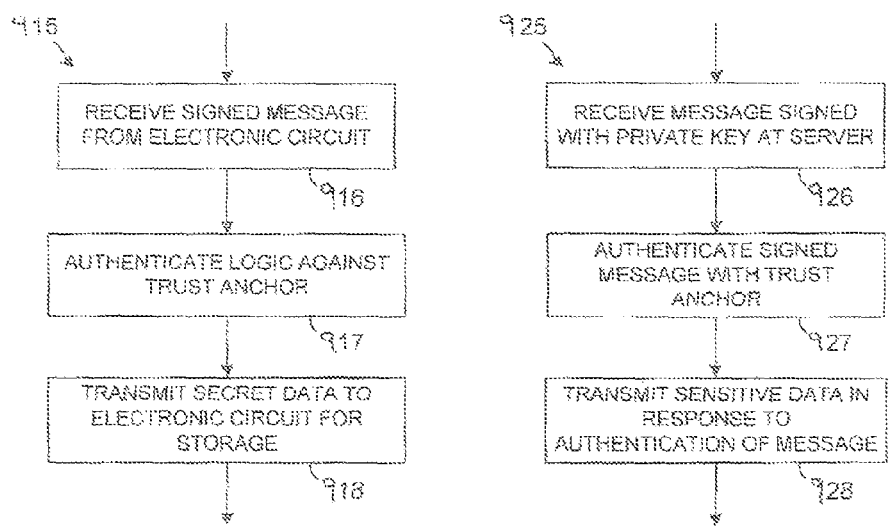
FIG. 9.1

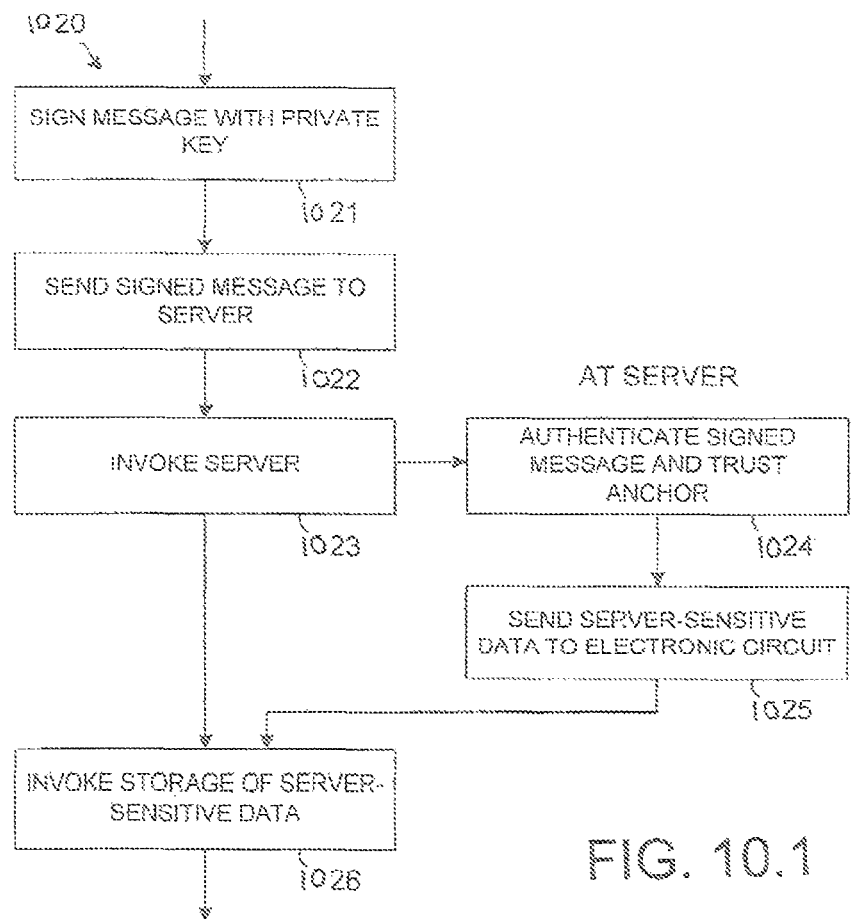
FIG. 10.1

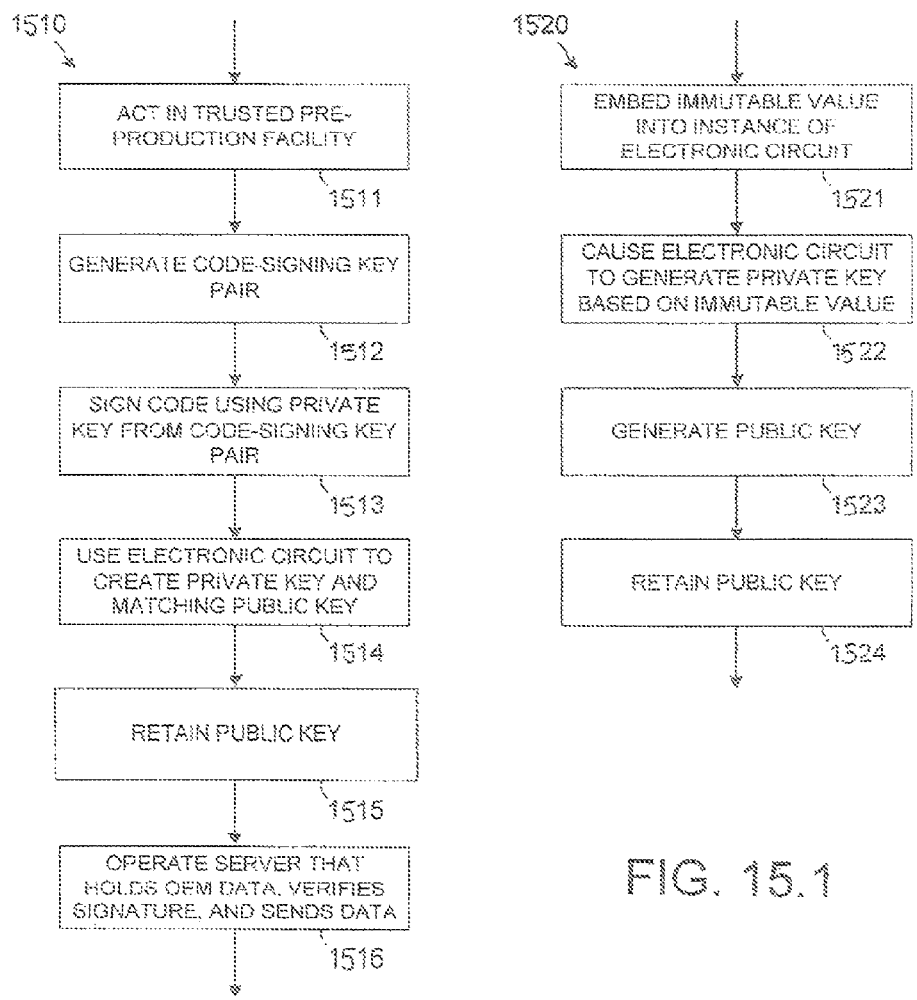
FIG. 15.1

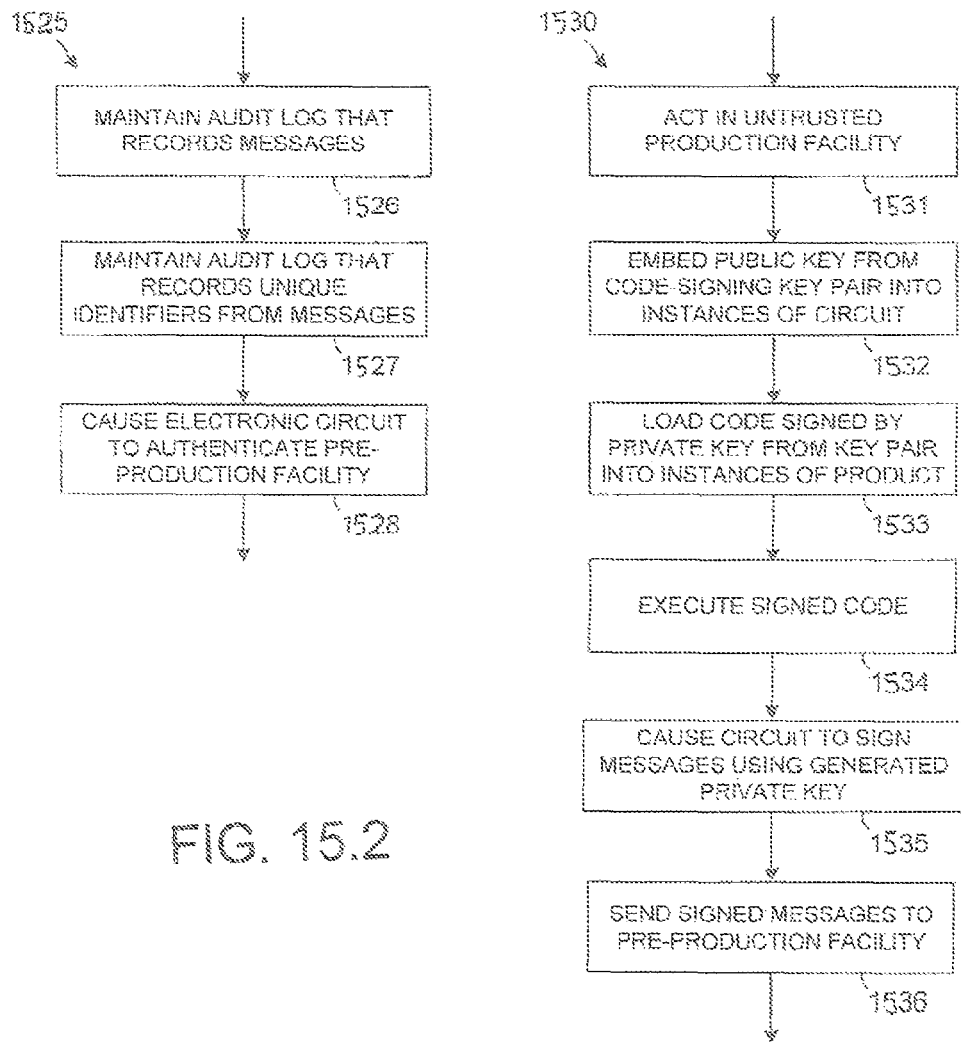
FIG. 15.2

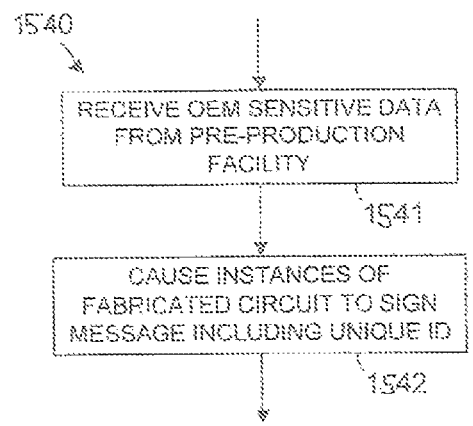
FIG. 15.3

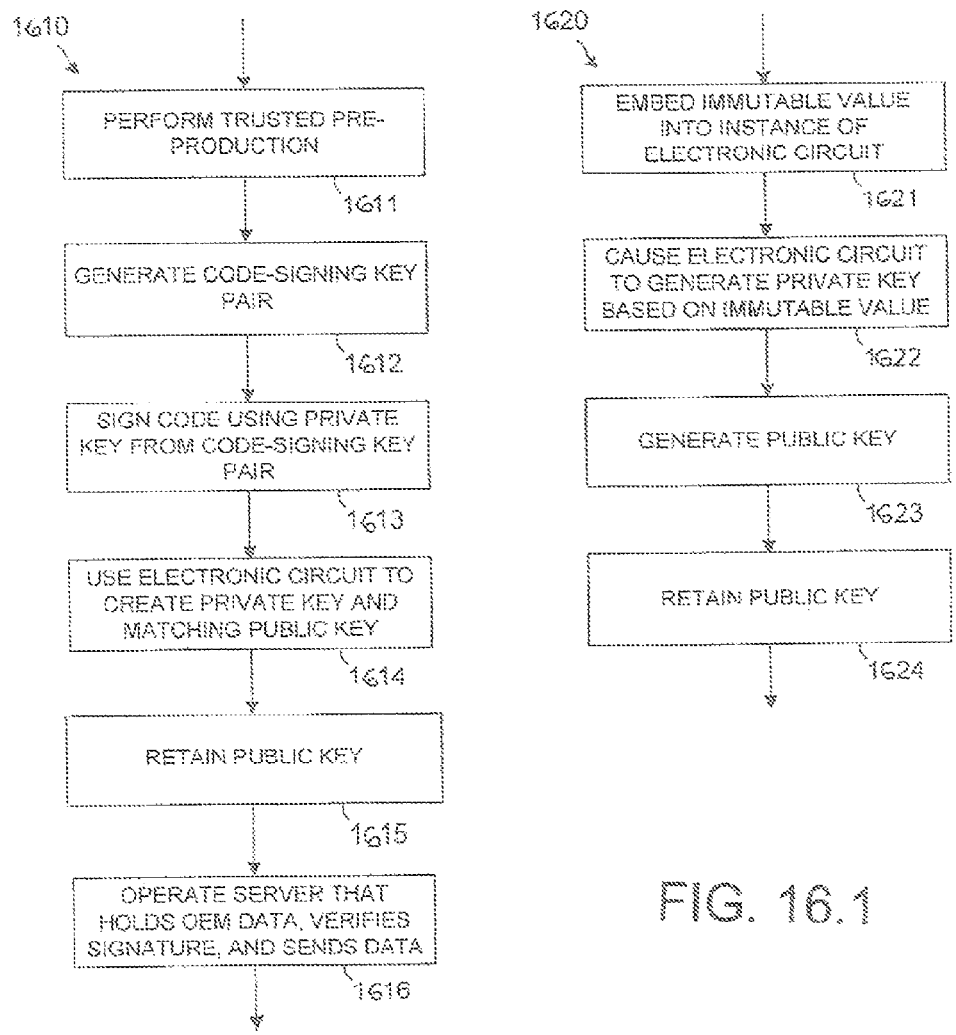
FIG. 16.1

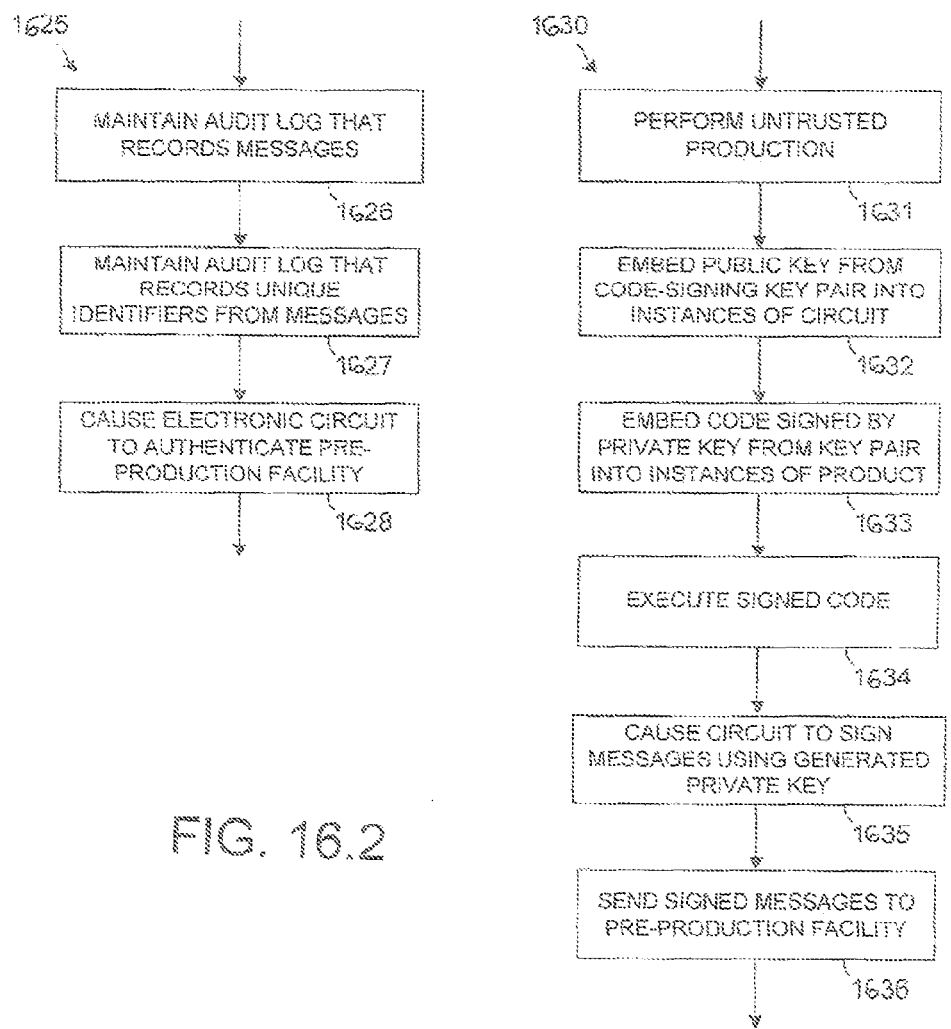
FIG. 16.2

SECURE PROVISIONING IN AN UNTRUSTED ENVIRONMENT

RELATED APPLICATION

This application is a Continuation-in-Part of co-pending, U.S. patent application Ser. No. 13/601,993, filed on Aug. 31, 2012.

BACKGROUND

Cryptography can be used in data processing, information processing, computing system, or the like to secure operations and/or functions. Examples of cryptographic systems include secure email systems, smartcards, point of sales terminals, network routers, and the like including methods such as digital signatures, cryptographic hash functions, key management techniques, and the like. Cryptographic systems include cryptographic primitives of various levels of complexity.

Typical cryptographic systems include algorithms for key generation, encryption, decryption, and the generation of digital signatures. A digital signature refers to a pair of algorithms, one for signing a message, and one for verifying the signature of a message. Cryptographic systems commonly use a key generation algorithm and often exploit public key techniques and/or symmetric key techniques.

BRIEF DESCRIPTION OF THE DRAWINGS

Embodiments of the invention relating to both structure and method of operation may best be understood by referring to the following description and accompanying drawings:

FIG. 9, including FIG. 9.1, depicts schematic flow charts showing an embodiment or embodiments of a method of provisioning an electronic circuit that enables security of sensitive data in a design and manufacturing process that includes multiple parties in which provisioning actions can generally pertain to an OEM facility of the multiple parties.

DETAILED DESCRIPTION

Figure 1:
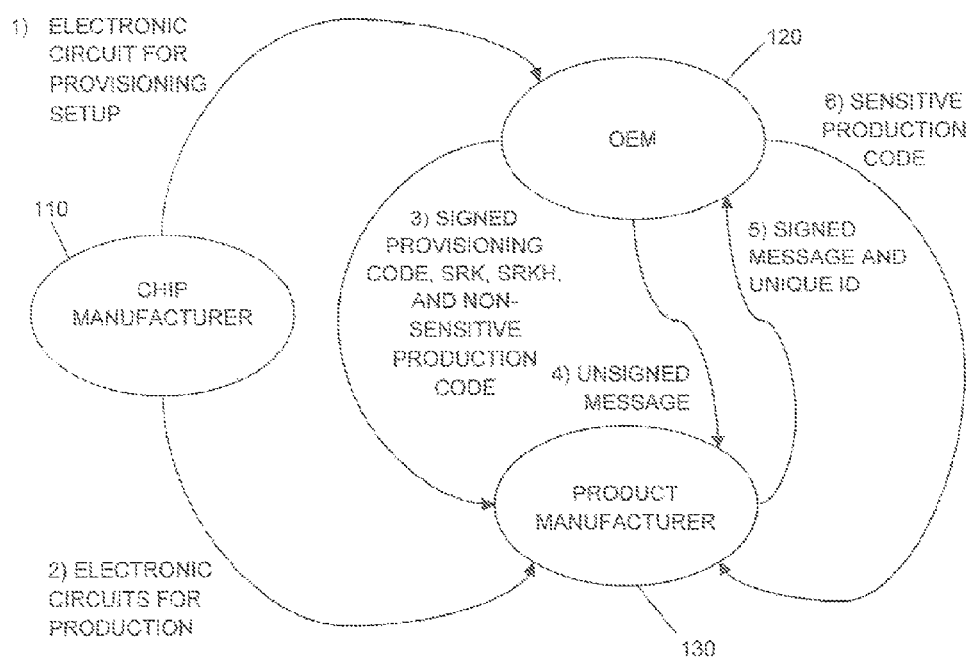
FIG. 1 is a schematic block diagram illustrating an embodiment of a production system that facilitates secure provisioning of circuits, systems, and devices in a potentially untrusted environment.

In producing an electronic product, an original equipment manufacturer (OEM) may purchase electronic components, electronic circuits, and non-electronic components from various sources, and have the components shipped to a third-party manufacturer (referred to herein as a "product manufacturer" or "contracted manufacturer"). The product manufacturer assembles the components and produces the product. During the production process, the product manufacturer may be required to "provision" the product. As used herein, the term "provision" means to perform various customizations that make the product functional. For example, in various embodiments, and as will be described in more detail later, provisioning may include loading production code (or a production code image) into the product's memory (e.g., non-volatile memory), loading other data into the product's memory (e.g., feature-enabling information), and establishing various "immutable" (i.e., persistent and unchangeable) values in the device (e.g., burning the values into fuses), among other things. In most cases, the OEM may wish to verify that the product manufacturer builds the product only for the OEM and according to a contract between the OEM and the product manufacturer. For example, the OEM may wish to verify that the product manufacturer does not build more products than the contract specifies, and to verify that the product manufacturer does not sell products without knowledge of the OEM. The OEM also may wish to ensure that the product manufacturer does not release OEM confidential information ("OEM product design secrets") without authorization.

Embodiments of systems, circuits, components, and techniques disclosed herein enable an OEM to verify that a product manufacturer (or other party) builds only a quantity of products that the OEM desires, and to guarantee that the product manufacturer does not release OEM product design secrets. As will be described in more detail later, embodiments include electronic circuits, electronic devices (or "electronic products"), and systems that employ asymmetric public key cryptography techniques to perform secure provisioning of the electronic circuits within the electronic devices.

Asymmetric public key cryptography involves the use of a mathematically related key pair, including a "private key" and a "public key" to sign and to verify a signature, respectively. More particularly, the private key may be used to sign a message in order to produce a signed message, and the public key may be used to verify the signature of the message. When public key cryptography is used in a system to ensure verifiable, one-way information transfer between two distinct entities (e.g., an electronic circuit within a device at a product manufacturer's fabrication site and an OEM server), a first entity may provide the public key to a second entity, while retaining the private key as a secret. The first entity may then sign a "challenge" message with the private key, and send the resulting digital signature along with the message to the second entity. The second entity may then verify the signature using the message and the public key. In this manner, the second entity can verify the correctness of the message, as well as establish the identity of (i.e., authenticate) the sender (i.e., the first entity).

According to various embodiments, asymmetric cryptographic techniques are used to securely provision a device that is being manufactured by a product manufacturer, including performing a chip authentication process and securely sending production code from the OEM to the product manufacturer. To perform these processes, an embodiment of a production method involves using two key pairs. These two key pairs are referred to herein as a "message signing key pair" (which includes a "message signing public key" and a "message signing private key"), and a "code signing key pair" (which includes a "code signing public key" and a "code signing private key"). As will be described in more detail below, during manufacture of a product at a product manufacturer's site, an electronic circuit in the device contacts the OEM (e.g., an OEM server) to request download of provisioning information (e.g., a production code image). Prior to downloading the provisioning information, a cryptographic exchange using the message signing key pair is performed to ensure that the electronic circuit is an authentic electronic circuit (e.g., an electronic circuit built using authentic components specified by the OEM and running authentic OEM provisioning code in a trusted state). Another cryptographic process using the code signing key pair is performed to verify that OEM provisioning code (or production code) is running on the device.

A brief description of a method of manufacturing and provisioning an electronic device (or "product") will now be given in conjunction with FIG. 1, which is a schematic block diagram illustrating an embodiment of a production system that facilitates secure provisioning of circuits, systems, and devices in a potentially untrusted environment. FIG. 1 should be viewed in parallel with FIG. 2, which is a flowchart of a method for performing secure provisioning, according to an embodiment. FIG. 1 illustrates three entities that may be involved in the embodiment of the secure partitioning method illustrated in FIG. 2. For example, the entities may include a "chip" manufacturer 110, an OEM 120, and a product manufacturer 130. In addition, FIG. 1 indicates electronic circuits and various types of code and other information that are exchanged between the chip manufacturer 110, the OEM 120, and the product manufacturer 130 in performing an embodiment of the method. Those of skill in the art would understand, based on the description herein, that more or fewer distinct entities may be involved in the below-described manufacturing and provisioning process.

In general, the OEM 120 is responsible for designing a product that includes an electronic circuit manufactured by the chip manufacturer 110. Ultimately, the product (including the electronic circuit) will be manufactured by the product manufacturer 130. Product design by the OEM 120 includes producing various types of code that will be executed by the electronic circuit during provisioning of the product and during normal operation of the product (e.g., "in the field"). As will be described in more detail later, the OEM 120 more specifically may be responsible for producing at least two types of code, which will be loaded onto and/or accessed by the electronic circuit. The code types produced by and/or provided by the OEM 120 are referred to herein as "provisioning code" (embodied as a "provisioning code image") and "production code" (embodied as one or more "production code images"). In general, the provisioning code is configured to invoke and control the process of provisioning the electronic circuit (e.g., while the electronic circuit is in the possession of the product manufacturer 130). For example, and as will be explained in more detail below, the provisioning code may be configured to perform some or all of the following functions: a) coordinate generation of a signed message; b) establish a secure provisioning channel with the OEM 120; and c) coordinate download of production code over the secure provisioning channel.

The production code includes code that is executed by the electronic circuit during normal operations of the product within which the electronic circuit is incorporated. According to an embodiment, the production code may include a "non-sensitive" portion of code and a "sensitive" portion of code. As will be described in more detail below, the OEM 120 may provide the non-sensitive production code to the product manufacturer 130 over a non-secure or "clear" communication channel, and the OEM 120 may provide the sensitive production code to the product manufacturer 130 over a secure communication channel (e.g., an SSL connection), in an embodiment. In an alternate embodiment, the OEM 120 may provide both the sensitive and non-sensitive portions of the production code to the product manufacturer 130 over a secure channel. In such an embodiment, the production code may not be separated into sensitive and non-sensitive portions.

In order to securely download the sensitive production code image and perform other provisioning tasks, the chip manufacturer 110 may develop a third type of code, referred to herein as "secure boot code" (embodied as a "secure boot code image"). As will be described in more detail later, the secure boot code may be configured to perform some or all of the following functions: a) coordinate cryptographic key generation; b) generate a hash of the provisioning code; and c) verify the provisioning code.

The product manufacturer 130 is responsible for producing the product according to specifications of the OEM 120. This includes receiving the various product components from the chip manufacturer 110 and other sources, assembling the components, and provisioning the product (including loading the provisioning and production code images into the product to be executed by the electronic circuit). The production method embodiments described herein relate to the provisioning of the electronic circuit during production of the product.

Figure 2:
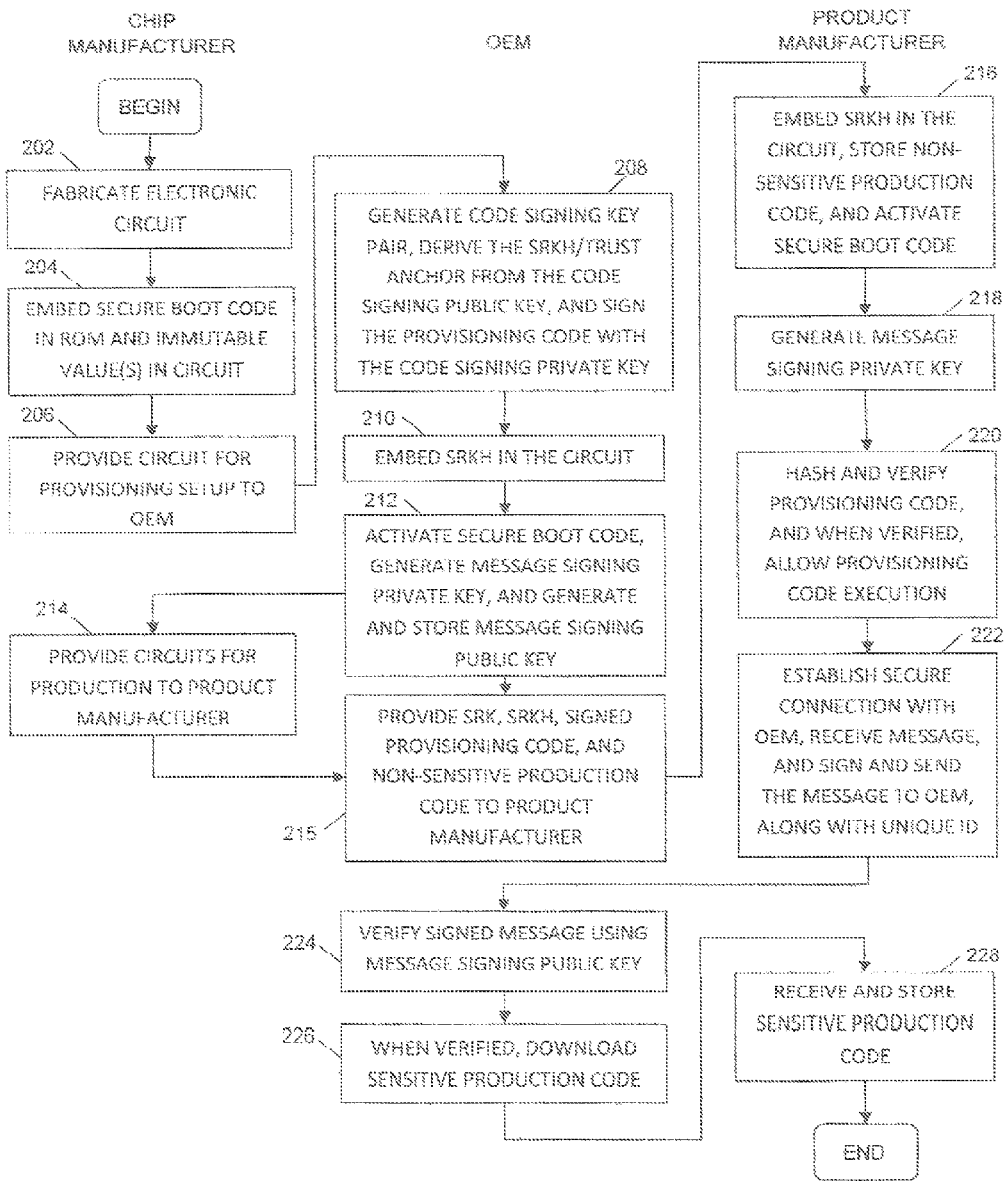
FIG. 2 is a flowchart of a method for performing secure provisioning, according to an embodiment.

Various production method embodiments may be more clearly described with reference to FIG. 2. FIG. 2 is divided into three columns, one each for the chip manufacturer 110, the OEM 120, and the product manufacturer 130. Actions performed either by a particular entity or actions performed by an electronic circuit while in the possession of the particular entity are aligned within their respective columns. Blocks 202-214 represent processes that are performed by the chip manufacturer 110 and the OEM 120 prior to product production by the product manufacturer 130, and blocks 216-222 represent processes that occur during product production and provisioning by the product manufacturer 130.

The method may begin, in block 202, when the chip manufacturer 110 fabricates a plurality of electronic circuits (various embodiments of which will be described later in conjunction with FIGS. 3-5). The electronic circuit may include one or more integrated circuits and other components, and may be embodied as a System-on-a-Chip (SOC), a System-In-Package (SIP), and/or a system that is implemented using multiple packaged devices (e.g., assembled on one or more printed circuit boards).

In block 204, the chip manufacturer 110 embeds the secure boot code in the electronic circuit (e.g., in a masked read only memory (ROM) of the electronic circuit). In addition, the chip manufacturer 110 may store a unique identifier (ID) in non-volatile storage of the electronic circuit. According to an embodiment, the chip manufacturer 110 also embeds one or more additional "secret values" in the electronic circuit. For example, according to a specific embodiment, the chip manufacturer 110 embeds three secret values in the electronic circuit. As will be explained in more detail later, a first secret value may be embedded in logic gates, a second secret value may be burned into a set of fuses, and a third secret value may be embedded in protected non-volatile memory (e.g., in the secure boot code embodied in the masked ROM). Although the embodiments described herein describe embedding three specific types of secret values in the electronic circuit, other embodiments may include embedding more or fewer than three secret values and/or embedding different types of secret values in the electronic circuit.

In block 206, the chip manufacturer 110 provides an electronic circuit to the OEM 120 for the OEM 120 to use in setting up the provisioning process (exchange "1" in FIG. 1). According to an embodiment, the electronic circuit provided by the chip manufacturer 110 to the OEM 120 includes the secure boot code, the unique ID, and the one or more additional secret values discussed above. Upon receiving the electronic circuit from the chip manufacturer 110, the OEM 120 may connect the electronic circuit to a computer system of the OEM 120 (e.g., via a USB link, a JTAG interface, or any other suitable connection). As used herein, the term "computer system" means one or more networked computers (e.g., servers) and/or non-networked computers, as appropriate for the tasks being performed by the system.

In block 208, the OEM computer system may coordinate generation of a code signing key pair consisting of a code signing public key and a code signing private key. More specifically, the OEM computer system may generate the code signing private key using a random or pseudo-random number, and subsequently may generate the code signing public key based on the code signing private key. The public key from the code signing key pair alternatively may be referred to herein as a Super Root Key (SRK). The code signing public and private keys are stored in the OEM computer system, and retained for later use. Importantly, the code signing private key is maintained in secret by the OEM 120 (e.g., the OEM 120 may refrain from providing the code signing private key to the chip manufacturer 110, the product manufacturer 130, or any other external entity).

According to an embodiment, the OEM computer system creates a hash of the code signing public key. The code signing public key is referred to herein as a Super Root Key (SRK), and a value derived from the code signing public key is referred to herein as a Super Root Key Hash (SRKH) or "trust anchor." The SRKH may be a hash of the SRK, in an embodiment, or it may the SRK or some other value derived from the SRK, in other embodiments. In addition, the OEM computer system may sign the provisioning code using the code signing private key, thus creating a digital signature of the provisioning code. The digital signature may be appended to the provisioning code. The combination of the provisioning code and its digital signature is referred to herein as the "signed provisioning code".

In block 210, the OEM 120 stores the previously-calculated SRKH in the electronic circuit in a non-volatile manner. For example, according to an embodiment, the OEM 120 may burn the SRKH into a set of fuses of the electronic circuit. In block 212, the OEM computer system invokes the secure boot code to cause the private key derivation logic of the electronic circuit to generate a private key using a combination of the SRKH and the multiple secret values. This private key is referred to herein as a message signing private key. Once the message signing private key has been generated, the OEM 120 causes the public key derivation logic of the electronic circuit to generate a corresponding public key, referred to herein as a message signing public key. The message signing public and private keys make up a message signing key pair. The electronic circuit stores the message signing private key in secure storage on the electronic device (e.g., in a protected register). The message signing private key is inaccessible to all but the message signing logic of the electronic circuit, in an embodiment, and is not provided to any entity outside of the electronic circuit (e.g., including the OEM 120). On the other hand, the message signing public key is accessible, and the electronic circuit sends the message signing public key to the OEM computer system. The OEM computer system receives and stores the message signing public key so that the OEM 120 may later use the message signing public key during a chip authentication process performed between the OEM 120 and the product manufacturer 130. Desirably, the OEM computer system stores the message signing public key in a secure manner to ensure that that no other party can switch public keys without the OEM's knowledge.

Production of a product that includes the electronic circuit may begin with the performance of blocks 214 and 215. More specifically, in block 214, the chip manufacturer 110 provides multiple electronic circuits to the product manufacturer 130 (exchange "2" in FIG. 1). According to an embodiment, each of the electronic circuits provided by the chip manufacturer 110 to the product manufacturer 130 also includes the secret values, the secure boot code, and the unique product ID. Upon receiving the electronic circuits for production from the chip manufacturer 110, the product manufacturer 130 may connect each electronic circuit to a computer system of the product manufacturer 130 (e.g., via a USB link, a JTAG interface, or any other suitable connection).

In block 215, a channel may be established between the OEM computer system and the product manufacturer computer system, and the OEM computer system may provide the full SRK, the SRKH, the signed provisioning code, and non-sensitive portions of the production code to the product manufacturer computer system (exchange "3" in FIG. 1), in an embodiment. The channel may be an unsecured or "clear" channel, in an embodiment. Alternatively, the channel may be a secure channel (e.g., an SSL channel). Thus, in various embodiments, the SRK, SRKH, the signed provisioning code, and the non-sensitive portions of the production code may be sent "in the clear" or securely. In an alternate embodiment, the OEM computer system may provide the SRK without the SRKH, and the product manufacturer may derive the SRKH from the SRK.

In block 216, with the secure boot code inactivated, the product manufacturer 130 embeds the SRKH in each production electronic circuit (e.g., by burning the SRKH into fuses of each electronic circuit), and stores the non-sensitive production code in non-volatile memory of the electronic circuit. The product manufacturer computer system then activates the secure boot code.

In block 218, the secure boot code causes the private key derivation logic of the electronic circuit to generate the message signing private key using the combination of the SRKH and the multiple secret values embedded in the electronic circuit. When the SRKH has the same value as calculated by the OEM 120 in block 208, and the multiple secret values are the correct values as embedded by the chip manufacturer 110 in block 204, the message signing private key generated in block 218 is identical to the message signing private key generated in block 212, indicating that the electronic circuit is authentic and the SRKH is correct. Otherwise, the message signing private key generated in block 218 will not match, indicating that the electronic circuit is not authentic and/or that the SRKH is not correct. In any event, the electronic circuit stores the message signing private key in a secure location on the electronic circuit (e.g., in a protected register).

The secret values embedded in the electronic circuit allow the private key derivation logic to generate private keys that are secret. The SRKH is used to modify the generated private key, which allows each private key to be made specific to a particular OEM 120 and to a specific product. In an embodiment, the SRKH and the secret values are the same in each copy of the electronic circuit that is included within the specific product, and thus each electronic circuit will derive the same private key. Because the SRKH and the secret values are immutable (i.e., fixed and not changeable), the electronic circuit will generate the same private key each time it is turned on. It is the combination of secret values common to all copies of the electronic circuit and the public, but immutable, SRKH, which allows the electronic circuit to generate a message signing private key that the OEM 120 can trust to be correct only when the electronic circuit is provisioned correctly.

In block 220, the secure boot code performs a derivation operation (e.g., hash) on the SRK from the provisioning code supplied by the OEM 120 (in block 215), and compares the result with the SRKH stored in the electronic circuit (e.g., in fuses), thus verifying (or authenticating) the SRK against the SRKH. In addition, the secure boot code verifies the provisioning code signature supplied by the OEM 120 (in block 215) using the code signing public key (i.e., the SRK). Once the secure boot code has verified the provisioning code and the provisioning code signature, the secure boot code launches the provisioning code. If the provisioning code and/or the provisioning code signature is not properly verified, the provisioning code will not be executed, and the provisioning process will fail.

In block 222, assuming that the provisioning code and its signature have been properly verified, the provisioning code establishes a secure connection between the product manufacturer's product that contains the electronic circuit and the OEM computer system (e.g., an SSL connection, referred to herein as a "secure provisioning channel"). Over the secure provisioning channel, the OEM computer system sends the electronic circuit a "challenge" message (exchange "4" in FIG. 1). The provisioning code receives the message and prepares a "response" message. According to an embodiment, the provisioning code prepares the response message by concatenating the challenge message and the unique ID of the electronic circuit, and causing the message signing logic of the electronic circuit to sign the concatenated message using the message signing private key derived in block 218. The provisioning code then causes the electronic circuit to send the signed response message to the OEM computer system over the secure provisioning channel (exchange "5" in FIG. 1). In an alternate embodiment, the provisioning code may exclude the unique ID from the response message. In another alternate embodiment, the provisioning code may prepare the response message by concatenating the challenge message with the SRKH (with or without the unique ID).

In block 224, the OEM computer system receives the signed response message (including the unique ID) from the electronic circuit, and the OEM computer system verifies the signed response message using the previously-stored message signing public key (i.e., the message signing public key generated in block 212). In addition, according to an embodiment, the OEM computer system may maintain a log of unique IDs for electronic circuits that have been previously provisioned. In such an embodiment, the OEM computer system may determine whether the unique ID received from the electronic circuit matches any of the previously-stored unique IDs in its log. If so, or if a maximum number of electronic circuits already have been provisioned by the OEM 120, the OEM computer system may refrain from providing the sensitive production code and/or other sensitive OEM information (referred to collectively herein as "sensitive provisioning information") to the electronic circuit, regardless of whether or not the signed message was properly verified. Otherwise, when the OEM computer system has properly verified the signed message and has determined that the electronic circuit corresponding to the unique ID may be provisioned, the OEM computer system downloads the sensitive production code and/or other sensitive OEM information to the electronic circuit over the secure provisioning channel, in block 226 (exchange "6" in FIG. 1). In block 228, the provisioning code stores the sensitive production code in secure non-volatile memory of the electronic circuit. At that point, the secure provisioning channel may be torn down, and the electronic circuit is properly provisioned.

Figure 3:
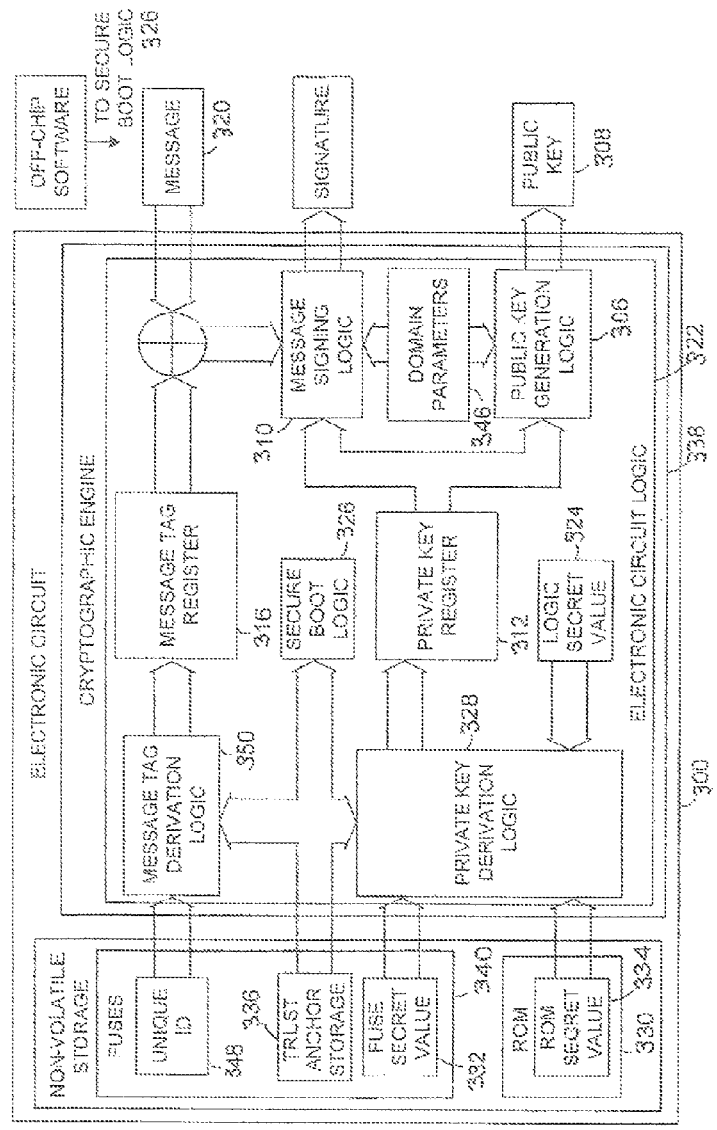
FIG. 3 is a schematic block diagram depicting an embodiment of an electronic circuit that enables security of sensitive data in a design and manufacturing process that includes multiple parties.

Referring to FIG. 3, a schematic block diagram depicts an embodiment of an electronic circuit 300 that enables security of sensitive data in a design and manufacturing process that includes multiple parties (e.g., chip manufacturer 110, OEM 120, and product manufacturer 130, FIG. 1). More specifically, the electronic circuit 300 depicted in FIG. 3 represents an electronic circuit after manufacture by a chip manufacturer 110, but prior to provisioning. An embodiment of an electronic circuit 300 can include private key derivation logic 328 that derives a message signing private key from a plurality of components including at least one component known only to the electronic circuit 300 and residing either within the circuit logic 324, within fuses 332, or within ROM 334, or any combination of components residing in those locations. For example, referring again to FIG. 2, the components from which the message signing private key is derived may include the secret values embedded in the electronic circuit in block 204 and the SRKH stored in the electronic circuit in block

210. The message signing private key is derived in blocks 212 (by the OEM 120) and 218 (by the product manufacturer 130).

An embodiment of an electronic circuit 300 can also include public key generation logic 306 that generates a message signing public key 308 to match the message signing private key (e.g., in blocks 212 and 218). The message signing public key 308 is typically not stored inside the electronic circuit 300, but is written out to memory so that software can send the message signing public key 308 off-chip (e.g., to be stored on the OEM server). An embodiment of an electronic circuit 300 can also include message signing logic 310 that signs messages with the message signing private key (e.g., in block 222, FIG. 2). An embodiment of an electronic circuit 300 can further include the one or more immutable values that will be cryptographically bound into messages signed by the electronic circuit 300.

In an illustrative embodiment, FIG. 3 shows structures on the electronic circuit 300, for example an integrated circuit chip, as produced by a chip manufacturer (e.g., in block 202, FIG. 2). The electronic circuit 300 is purely static, including components and connections. The electronic circuit 300 includes trust anchor storage 336 (e.g., storage configured to store the SRKH), as yet with no value since the electronic circuit 300 has not yet been fully provisioned. Similarly key and tag registers do not contain determined values prior to provisioning. Off-chip items are shown for the purpose of describing the function of the on-chip logic of the electronic circuit 300. Any suitable arrangement of items on the electronic circuit 300 can be implemented. The depicted values in non-volatile storage, fuses, ROM, logic, and the like are illustrative of possible locations of storage on the electronic circuit 300. The arrangement enables different parties to provision different secret values.

In some embodiments, the electronic circuit 300 can include private key derivation logic 328 that derives (e.g., in blocks 212, 218, FIG. 2) the message signing private key from multiple components including a trust anchor read from the trust anchor storage 336 (e.g., the SRKH generated in block 208, FIG. 2). When the message signing logic uses the message signing private key to sign a message 320 (e.g., in block 222, FIG. 2), the trust anchor is cryptographically bound into the signed message by virtue of having been used to derive the message signing private key. The message 320 is not stored inside the electronic circuit 300, but is read from memory where the message 320 is assembled by software. The signature/signed message is also written out to memory for software to send off-chip, in a similar manner as the message signing public key. In other embodiments, the electronic circuit 300 can include message tag derivation logic 350 that derives a message tag from the trust anchor read from trust anchor storage 336 and a unique ID 348. The message signing logic 310 can cryptographically bind the trust anchor and unique ID 348 into messages by incorporating the message tag in the message that is then signed by the message signing logic 310. In either case the trust anchor is cryptographically bound to the signed message.

The secret information used to derive the private key can be divided into multiple components, including the trust anchor and a "secret values" that is embedded in the electronic circuit 300 by the chip manufacturer 110 (e.g., in block 204, FIG. 2). In some example embodiments, the secret can be arranged into three different components, one in logic gates 324, one in fuses 332, and one in ROM 334, to form a split key. The three key splits can be combined to generate one secret value. Illustrative embodiments of the disclosed system, components, and techniques may or may not include split keys, which are useful to increase the difficulty of reverse engineering the secret.

In a further embodiment, the electronic circuit 300 can include private key derivation logic 328, a private key register 312 that stores a message signing private key (e.g., the message signing private key derived in blocks 212, 218, FIG. 2) configured to be writable exclusively by the private key derivation logic 328 and readable exclusively by the public key generation logic 306 and the message signing logic 310, a message tag register 316 that stores a message tag configured to be locked against subsequent changes, and message signing logic 310 that concatenates a received message 320 (e.g., the challenge message received in block 222, FIG. 2) with the message tag read from the message tag register 316 and signs the concatenated message 320 and message tag with the private key read from the private key register 312. In other embodiments and/or applications, the electronic circuit 300 can include electronic circuit logic 322, a secret value 324 that is masked and etched into the private key derivation logic 328, secure boot logic 326 and a secret value 334 in on-chip masked ROM 330, and a secret value 332 embedded by a fabrication facility into fuses 340 (e.g., embedded by chip manufacturer 110, FIG. 1 in block 204, FIG. 2). The logic-embedded secret value 324 is designed into the electronic circuit 300 and unknown and unknowable external to the electronic circuit 300. The secure boot logic 326 is permanently read-only and cannot be updated. The ROM secret value 334 may also be embedded into ROM 330, and is unknown and unknowable except by the secure boot logic 326. The fuse secret value 332 is distinct and common to the circuit-model copies of the electronic circuit 300 and unknown and unknowable except by the electronic circuit 300 and the secure boot logic 326.

According to further embodiments, the electronic circuit 300 can be configured such that the private key derivation logic 328 derives the message signing private key from one or more independent secret values 324, 332, 334 (e.g., the secret valued embedded in block 204, FIG. 2) and one or more immutable values including the trust anchor (e.g., the SRKH embedded in blocks 210 and 216, FIG. 2) read from the trust anchor storage 336, and stores the derived message signing private key in a protected register 312, preventing subsequent modification of the message signing private key. In an illustrative embodiment, the derivation and storage of the message signing private key can be implemented in a cryptographic engine or module 338 in conjunction with secure boot logic 326. In other embodiments, derivation and storage of the message signing private key can be performed completely within the cryptographic engine 338 which can fetch all input values for key derivation. The term "independent" in the independent secret value 324, 332, 334 means that different parties can generate and provision the secret values with no party having access to multiple secret values. In various embodiments, the electronic circuit 300 can store the one or more independent secret values 324, 332, 334 in various types of accessibility-limited protected storage such as one or more of a Register Transfer Level (RTL) secret 324 permanently wired into circuit logic such as the private key derivation logic 328, a ROM value 334 permanently masked into on-chip ROM 330 (for example ROM, EPROM, or flash), a fuse value 332 burned into on-chip fuses 340 such that multiple secrets are independently provisioned by multiple parties, and the like.

In an example embodiment, the electronic circuit 300 can be a system on a chip (SOC) based on a suitable processor such as a PowerPC, ARM, or the like. The SOC typically includes one or more processors, an interface to peripherals, memory controllers, a network port such as an Ethernet port, Universal Serial Bus (USB), serial ports, and the like. The SOC electronic circuit 300 can include a cryptographic engine 338, for example a cryptographic accelerator module that implements the various aspects of the disclosed security protection. The cryptographic engine 338 can include a random number generator, encryption hardware blocks, a hashing hardware block, a public key accelerator block, and other cryptographic functionality.

In further embodiments, the electronic circuit 300 can include one or more immutable domain parameters 346 in integrity-protected storage, such as an RTL value (e.g., logic secret value 324) permanently wired into circuit logic such as public key derivation logic 306 or message signing logic 310, a ROM value permanently masked into on-chip ROM 330 (EPROM or flash can otherwise be used but are less integrity-protected), and/or a fuse value burned into on-chip fuses 340. In some embodiments and/or applications, public key cryptographic techniques can include elliptic curve cryptography (ECC) based on the algebraic structure of elliptic curves over finite fields. To use ECC, participating parties agree on elements defining the elliptic curve that are specified as domain parameters 346 of the cryptographic scheme. The domain parameters 346 can include one or more field parameters and constants defining the elliptic curve.

Figure 4:
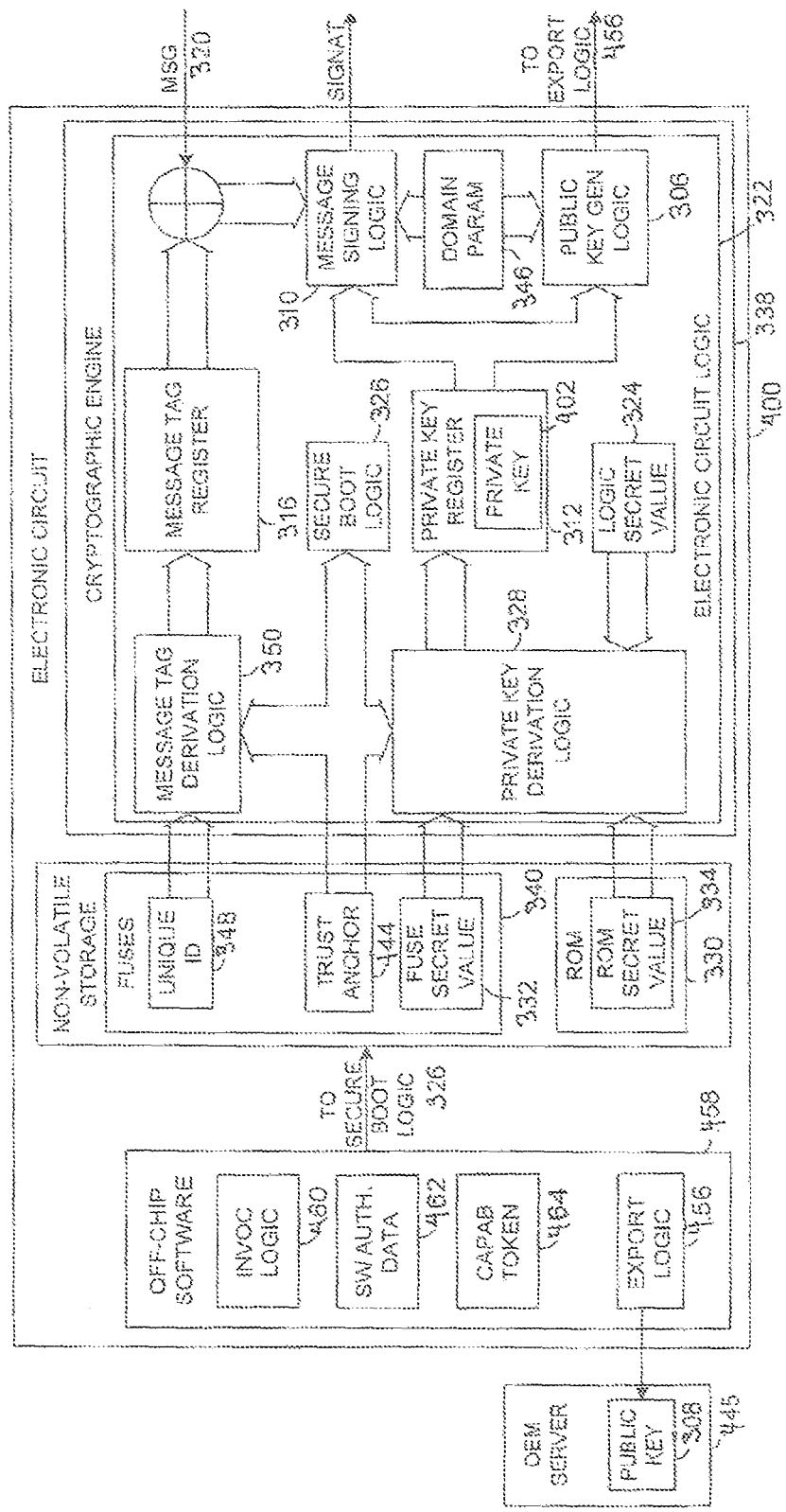
FIG. 4 is a schematic block diagram showing an embodiment of an electronic circuit for securing sensitive data in a multiple-party design and manufacturing process that includes an OEM.

Referring to FIG. 4, a schematic block diagram shows an embodiment of an electronic circuit 400 for securing sensitive data in a multiple-party design and manufacturing process that includes an OEM. More specifically, the electronic circuit 400 depicted in FIG. 4 represents an electronic circuit after the OEM 120 has received an electronic circuit from the chip manufacturer 110 (e.g., in block 208, FIG. 2), and the OEM 120 has generated and stored a trust anchor 444 (e.g., an SRKH) in the trust anchor storage 336 (e.g., in blocks 208, 210, FIG. 2). In some embodiments, the electronic circuit 400 can include at least one immutable value including an OEM trust anchor 444 (e.g., the SRKH) that is burned into on-chip fuses 340. In some embodiments and/or applications, the electronic circuit 400 can include one or more chip-unique IDs and/or other immutable values 348, a message tag register 316 for storing a message tag that is locked against subsequent modification, and message tag logic 350. The message tag logic 350 can derive a message tag from the one or more chip-unique identifiers 348 and other immutable values such as a trust anchor, store the message tag in the message tag register 316, and prevent subsequent modification of the message tag.

In an example embodiment, FIG. 4 shows structures and functions of the electronic circuit 400 during OEM pre-production (e.g., during steps 208, 210, 212, FIG. 2). The trust anchor value 444 and off-chip software 458 are provisioned using suitable tools (not shown). Software authentication data 462 can include, for example, a signature and full keys (if the trust anchor is a hash). A capability token 464 stops secure boot clearing of the private key. Invocation logic 460 runs after secure boot and invokes public key generation.

The trust anchor 444 (e.g., the SRKH) is an authoritative entity in cryptography that is represented via a public key or the hash of a public key and associated data, for example used in the context of public key infrastructures and digital certificates. In a chain of trust, generally the first entity to be trusted becomes the trust anchor. The trust anchor must be fixed, not allowed to be changed and can be stored in fuses 340. A message signing public key associated with the trust anchor 444 is used to verify digital signatures and the associated data. The message signing public key is used to constrain the types of information for which the trust anchor 444 is authoritative. A relying party uses trust anchors to determine whether a digitally signed object is valid by verifying a digital signature using the message signing public key derived from the trust anchor (e.g., in block 224, FIG. 2), and by enforcing the constraints expressed in the trust anchor's associated data.

In an example system, an electronic circuit including integrated circuit chips from an electronic circuit designer and/or fabricator (e.g., chip manufacturer 110) can have a first chip-specific secret embedded into logic gates, and a second chip-specific secret burned into write-only fuses. The OEM 120 can burn an immutable value that is integrity-sensitive information, for example a trust anchor (e.g., SRKH) into fuses in one instance of the electronic circuit from the chip manufacturer 110 (e.g., in block 210, FIG. 2). A trust anchor may be a code signing public key, or the hash of a code signing public key, or other value derived from a code signing public key (or some other value). In hardware, the chip can generate the message signing private key 402 from the first chip-specific secret, the second chip-specific secret and the immutable value (e.g., in block 212, FIG. 2), and then generate the corresponding message signing public key 308. The OEM retains the message signing public key 308 for use in authenticating the chips and for verifying that the chip's immutable value is in fact the OEM trust anchor.

The chip, for example electronic circuit 400, can also digitally sign messages (e.g., in block 222, FIG. 2) that attest that the chip is authorized by the electronic circuit designer and/or fabricator (e.g., chip manufacturer 110, FIG. 1), runs in a secure state, and that the OEM trust anchor is correct. The OEM can verify the authenticity of the message using the previously generated message signing public key 308 (e.g., in block 224, FIG. 2).

In additional embodiments, the electronic circuit 400 can include a private key register 312, private key derivation logic 328, at least one chip-unique ID 348, and secure boot logic 326. The private key derivation logic 328 derives a message signing private key 402 for storage in the private key register 312 (e.g., in blocks 212, 218, FIG. 2). The secure boot logic 326 can be configured to copy secret values to the private key derivation logic 328 and activate confidentiality protection on copied secret values and the private key register 312, copy chip-unique IDs 348 and the trust anchor 444 to the message tag logic 350 and activate protection on the message tag register 316, and authenticate off-chip software using the trust anchor 444, thereby preventing use of the message signing logic 310 unless the off-chip software is authenticated and contains the correct capability token for authorizing use and capability of the software. In a typical embodiment, secure boot logic 326 runs prior to executing off-chip software. In various implementations, actions of the secure boot logic 326 can be performed in various other electronic circuit elements or components, although the secure boot logic 326 efficiently performs the actions and can be selected based on considerations of convenience. The trust anchor 444 can be burned in on-chip fuses 340 (e.g., in blocks 210, 216, FIG. 2) and is the same value that is used in private key derivation. Otherwise, a contracted manufacturer (e.g., product manufacturer 130, FIG. 1) could use the OEM trust anchor 444 for the private key 402 and their own trust anchor for manufacturing software authentication, in which their own manufacturing software mishandles the OEM sensitive data. Message signing logic 310 cannot be allowed to generate a valid signature unless the secure boot operation succeeds, for example in that the signature over the off-chip software is validated correctly (e.g., in block 220, FIG. 2) with respect to the trust anchor 444 burned into fuses. Otherwise, malicious software could successfully run a challenge/response protocol and obtain OEM sensitive data from the server 445.

During manufacturing, the contracted manufacturer sends a signed message to the OEM's server 445 to obtain provisioning secrets or other sensitive data to be provisioned on the device 400 (e.g., in block 222, FIG. 2). If the manufacturer fails to burn the OEM trust anchor 444 correctly, or attempts to generate a signed message using a non-authorized chip, the message signing private key 402 will not be correct, the signature will fail to verify against the previously generated message signing public key, and the OEM's server 445 will detect an invalid request for the provisioning secrets or other sensitive data.

If the trust anchor 444 is used for private key derivation or if the trust anchor 444 is included as part of the signed message, the OEM's server 445 can verify that the trust anchor 444 is correct and that the chip is running signed OEM provisioning software (e.g., in block 224, FIG. 2). The OEM can be assured that the OEM-supplied secrets or OEM-sensitive information are properly handled. The signed message can include a unique ID 348 previously burned into fuses by the electronic circuit designer and/or fabricator to aid in auditing the manufacturing and provisioning processes.

During manufacturing, the contracted manufacturer (e.g., product manufacturer 130, FIG. 1) is required to burn the correct trust anchor 444 (e.g., in block 216, FIG. 2) and run the correct signed OEM provisioning code (e.g., in block 222, FIG. 2). The OEM provisioning code communicates with an OEM server (e.g., in block 222, FIG. 2) to obtain sensitive data to be embedded in the product (e.g., in block 228, FIG. 2), allowing secure embedding of sensitive data, as well as auditing of the manufacturing process. Any attempt by the manufacturer to act in a manner not desired by the OEM is detectable by the OEM.

Embodiments of the electronic circuit 400 can include a private key register 312, a message tag register 316, signing logic 310, at least one immutable value such as the trust anchor 444, private key derivation logic 328, and export logic 456. The private key register 312 stores a message signing private key 402 configured to be writable exclusively by the private key derivation logic 328 and readable exclusively by the public key generation logic 306 and the message signing logic 310. The message tag register 316 stores a message tag. The signing logic 310 concatenates a received message 320 with the message tag and signs the concatenated message 320 and message tag with the message signing private key 402 (e.g., in block 222, FIG. 2). The off-chip software authentication via secure boot logic 326 depends on the at least one integrity-sensitive or immutable value. Off-chip software authentication may or may not depend on the chip-unique identifiers and other values. The immutable value is the trust anchor 444 or includes the trust anchor 444. The private key derivation logic 328 derives the message signing private key 402 from (1) the logic-embedded secret value 324 (the logic-embedded secret value is embedded in logic (RTL), not fuses), (2) the non-volatile storage-embedded (fuse) secret value 332, and (3) the one or more immutable values including at least the trust anchor 444, and embeds the derived message signing private key 402 within the electronic circuit 400. Logic in off-chip software exports the message signing public key 308, generated to match the message signing private key 402, to the OEM for retention by the OEM (e.g., in block 212, FIG. 2). In some embodiments, the immutable value can be a trust anchor 444 represented by the hash of a code signing public key. The OEM-supplied software authentication via secure boot depends on the same trust anchor 444, as the export logic 456 that exports the message signing public key 308 generated to match the message signing private key 402 for retention by the OEM, thus assuring the OEM server 445 that both the chip hardware and the software running on the OEM server 445 are authentic when verifying the signed message (e.g., in block 224, FIG. 2). The OEM, upon retrieving the message signing public key, has physical control of the integrated circuit and does not need assurance about what software is running. The logic may require signing and a capability token to prevent the message signing private key from being erased before the message signing public key can be generated. With regard to the one or more integrity-sensitive values, the OEM cannot program the masked ROM, thus the trust anchor 444 can be programmed, for example, in on-chip fuses 340.

In further embodiments and/or applications, the electronic circuit 400 can include one or more off-chip components 458 for use in OEM pre-production including invocation logic 460 that invokes message signing public key generation and export for retention. Optionally, the off-chip component or components 458 further can include software authentication data 462 and a capability token 464 for testing. None of the off-chip components 458 can modify the message signing private key 402 or message tag stored in the message tag register 316.

Figure 5:
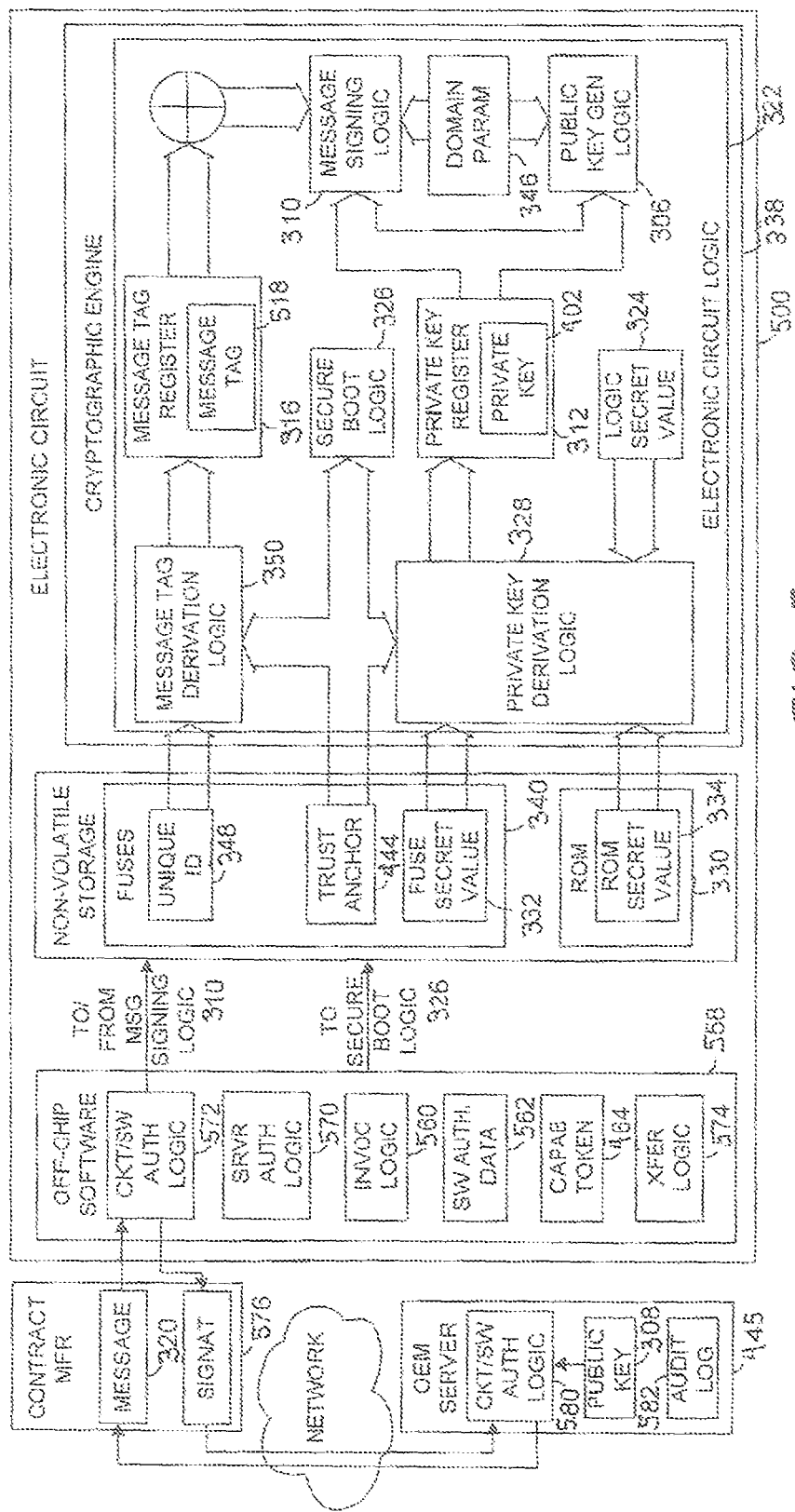
FIG. 5 is a schematic block diagram illustrating an embodiment of an electronic circuit for securing sensitive data in a multiple-party design and manufacturing process that includes a contracted manufacturer.

Referring to FIG. 5, a schematic block diagram illustrates an embodiment of an electronic circuit 500 for securing sensitive data in a multiple-party design and manufacturing process that includes a contracted manufacturer 576 (e.g., product manufacturer 130, FIG. 1). More specifically, the electronic circuit 500 depicted in FIG. 5 represents an electronic circuit after the product manufacturer 130 has received one or more electronic circuits from the chip manufacturer 110 (e.g., in block 216, FIG. 2) and the trust anchor (e.g., the SRKH) from the OEM 120, and the product manufacturer 130 has stored the trust anchor 444 (e.g., an SRKH) in the trust anchor storage 336 (e.g., in block 216, FIG. 2). In addition, FIG. 5 depicts operations that occur during the verification and provisioning processes of blocks 218-228. According to a further embodiment, the electronic circuit 500 can include invocation logic 560, and circuit and software authentication logic 572. The invocation logic 560 is activated by a contracted manufacturer 576 to derive the message signing private key 402 from (1) the logic-embedded secret value 324, (2) the non-volatile storage-embedded secret value 332, (3) the ROM-embedded secret value 334, and (4) the one or more immutable values including at least the trust anchor 444. The invocation logic 560 can sign data (e.g., in block 222, FIG. 2) using the derived message signing private key 402 for verification by the OEM (e.g., in block 224, FIG. 2). The circuit/software authentication logic 572 sends the signed message to the OEM for authentication and verification of the signed data using the message signing public key 308. The transfer logic 574 receives sensitive OEM data (e.g., in block 228, FIG. 2). The transfer logic 574 for communicating with the OEM server 445 can be contained in the OEM-supplied software, not in the electronic circuit logic, fuses or ROM. The sensitive OEM data might call for integrity rather than, or as well as, confidentiality.

In an illustrative embodiment, FIG. 5 shows the electronic circuit 500 during contracted manufacturing (e.g., during steps 216, 218, 220, 222, 228, FIG. 2). The trust anchor value 444 and off-chip software 558 are provisioned using tools (not shown). Circuit and software authentication logic 572 invokes message tagging and signing and passes a message/signature between the OEM server and the electronic circuit 500 (e.g., in block 222, FIG. 2). At the contracted manufacturing stage, the private key value 402 is contained in the private key register 312, and the message tag value 518 is contained in the message tag register 316.

In another embodiment or embodiments, the electronic circuit 500 can include authentication data 562, server authentication logic 570, circuit and software authentication logic 572, and transfer logic 574. The authentication data 562 is dependent on a trust anchor 444 (e.g., the SRKH), which is a reference metric used to authenticate the OEM-supplied software 558 that will be executed on the electronic circuit 500. Data residing within the electronic circuit 500 can include a capability token that is authenticated and allows use of the private key generation logic 328 or the message signing logic 310. The server authentication logic 570, which may be embedded in the OEM-supplied software 558, authenticates an OEM server 445 and establishes a secure connection with the authenticated OEM server 445 (e.g., in block 222, FIG. 2). The circuit and software authentication logic 572 authenticates the electronic circuit 500 and software 558 combination to the server 445 using a protocol, which may be a challenge/response protocol, including invoking the message signing logic 310 to sign a message 320 including a message tag 518 with a private key 402 (e.g., in block 222, FIG. 2). After mutual authentication between the electronic circuit 500 and the OEM server 445, the transfer logic 574 transfers sensitive OEM data between the OEM server 445 and electronic circuit 500 over a secure connection (e.g., in block 226, FIG. 2). The authentication data 562, server authentication logic 570, circuit and software authentication logic 572, and transfer logic 574 are typically off-chip software components for use in manufacturing. The server authentication logic 570 performs server authentication that is used to ensure a contracted manufacturer (e.g., product manufacturer 130, FIG. 1) does not tamper with OEM sensitive data by techniques such as supplying known cryptographic keys. An example is Transport Layer Security (TLS) server authentication, although any suitable server authentication can be used. The circuit and software authentication logic 572 performs client authentication that is used to ensure the contracted manufacturer does not obtain OEM sensitive data from the server 445 by deception. Inclusion of the trust anchor 444 in message signing private key derivation indirectly authenticates the software via secure boot. Any suitable challenge/response protocol can be used. The OEM sensitive data can be used by the transfer logic 574 in various ways. The OEM data can be stored in fuses, encrypted and stored off-chip, or not even stored but used to bootstrap some higher-level security protocol with another server. Other off-chip software components can be used in shipping devices including, for example, (1) other authentication data dependent on a trust anchor 444, (2) a capability token allowing use of the chip signature logic, or, (3) other useful logic. In some cases, the shipping software can be allowed to use the chip signature logic, but in many cases the shipping software is prevented, such as by withholding a capability token, from running the challenge/response protocol that would allow access to OEM sensitive data. OEM server components can include (1) logic (not shown) to authenticate to client (usually requiring a server private key) and establish a secure connection, (2) a copy of the message signing public key 308 generated during pre-production, (3) circuit/software authentication logic 580 to run a challenge/response protocol using the message signing public key 308, (4) an audit log 582 to record transactions with clients for auditing or fraud detection using message tags 318 embedded in signed responses (the main purpose of the message tag 318), and (5) logic (not shown) to transmit OEM sensitive data if mutual authentication and a secure connection are established.

Logic in the OEM server 445 for monitoring and recording transactions with clients for auditing or fraud detection enable the OEM to ensure that the manufacturer makes only the contracted amount of product. For example, when a message is sent to the chip for signing, the chip also includes a chip-unique identifier such as a serial number, a time and date stamp specifying manufacture of the chip, an identifier of wafer lot, X/Y coordinates on the wafer, and the like. The chip-unique identifier 348 can be a public value that is burned into every chip and guaranteed to be different for each chip. The chip-unique identifier 348 is a known or public value that is guaranteed to be distinct on each chip. When the OEM requests a chip to sign the message (e.g., in block 222, FIG. 2), the chip can append the chip-unique identifier 348 to the message before signing and reply with the chip-unique identifier 348 along with the signature to enable the OEM to append the chip-unique identifier 348 to the message and check the validity of the signature or the combination. The chip-unique identifier 348 facilitates auditing. When a chip in a product communicates with the OEM and signs the message, the OEM can log the chip-unique identifier 348. The OEM can track authorized chip-unique identifiers 348. When the OEM server 445 receives a signed message with a chip-identifier that is not authorized but for which the signature is correct, the OEM can detect that the manufacturer has built product beyond that specified by contract.

In another embodiment and/or application, the OEM can provision a unique and distinct device key onto each chip. For example, a High-Definition Multimedia Interface (HDMI) on a chip can have a specific device key. By binding a serial number to a protocol, the OEM can maintain a log of each chip that receives an HDMI key. The auditing capability enables the OEM to perform many security operations.

Communications between the OEM server and the contracted manufacturer are typically made over network communication during the manufacturing process. Typically, at the end of the manufacturing process and after the OEM has injected the sensitive data, the chip erases the message signing private key and can no longer sign messages. The OEM-signed code is provisioning code that is run only in the manufacturing process and is generally replaced with OEM-signed production code that is sent into the field in the product. The production code deletes the message signing private key so a part in the field cannot participate in the authentication process.

Figure 6:
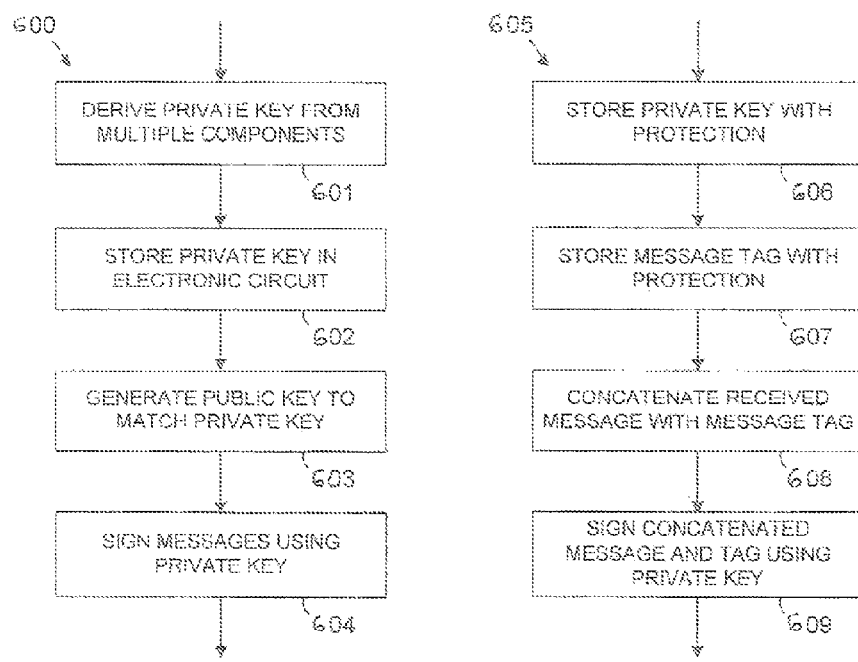
FIG. 6, including FIGS. 6.1, 6.2, 6.3, 6.4, and 6.5, are schematic flow charts showing an embodiment or embodiments of a method of operating an electronic circuit that enables security of sensitive data in a design and manufacturing process that includes multiple parties.

FIG. 6, including FIGS. 6.1, 6.2, 6.3, 6.4, and 6.5, are schematic flow charts showing an embodiment or embodiments of a method of operating an electronic circuit that enables security of sensitive data in a design and manufacturing process that includes multiple parties. The illustrative method 600 of operating an electronic circuit includes deriving 601 a message signing private key from a plurality of components including one or more components known only to the electronic circuit and one or more immutable values cryptographically bound into messages and residing on the electronic circuit, storing 602 the message signing private key within the electronic circuit, generating 603 a message signing public key to match the private key, and signing 604 messages with the message signing private key.

In a further embodiment, the method 605 of operating an electronic circuit further includes storing 606 a message signing private key that is writable exclusively by the private key derivation logic and readable exclusively by the public key generation logic and the message signing logic, storing 607 a message tag configured to be locked against subsequent changes, concatenating 608 a received message with the message tag, and signing 609 the concatenated message and message tag with the message signing private key. In other embodiments and/or applications, the method 610 of operating an electronic circuit can further include designing 611 a logic-embedded secret value into the electronic circuit that is unknown and unknowable external to the electronic circuit, and embedding 612 the logic-embedded secret value into electronic circuit logic such that the secret value is masked and etched into the electronic circuit logic. The method 610 can further include receiving 613 from the fabrication facility a non-volatile storage-embedded secret value that is distinct and common to circuit-model copies of the electronic circuit and unknown and unknowable except by the electronic circuit and secure boot logic, and embedding 614 the non-volatile storage-embedded secret value into fuses or on-chip masked ROM that is permanently read-only and cannot be updated.

In some embodiments, the method 615 of operating an electronic circuit further includes deriving 616 the message signing private key from one or more independent secret values and one or more immutable values, storing 617 the derived message signing private key in a protected register, preventing subsequent modification of the message signing private key, and preventing 618 subsequent access to the one or more independent secret values and preventing over-writing of the one or more immutable values. In additional embodiments, the method 620 of operating an electronic circuit further includes storing 621 one or more independent secret values in protected storage such as RTL permanently wired into circuit logic, a ROM permanently masked on-chip, EPROM, or flash, or on-chip fuses, or the like, such that the values are accessible only to internal hardware and such that multiple secrets can be independently provisioned by multiple parties. The method 620 can further include storing 622 into on-chip fuses one or more immutable values including a trust anchor configured as a code signing public key or hash of a code signing public key, and storing 623 in integrity-protected storage such as an RTL value permanently wired into circuit logic, a ROM value permanently masked into on-chip ROM, EPROM, or flash, or a fuse value burned into on-chip fuses, or the like, one or more immutable domain parameters selected from one or more of such domain parameters.

In some embodiments and/or applications, the method 625 of operating an electronic circuit can further include storing 626 one or more chip-unique identifiers in integrity-protected storage, deriving 627 a message tag from the one or more chip-unique identifiers, and storing 628 a message tag in a message tag register, thereby preventing subsequent modification of the message tag. The method 625 further includes deriving 629 a message signing private key for storage in the private key register, storing 630 one or more chip-unique identifiers in integrity-protected storage and a trust anchor configured as a code signing public key that is burned into on-chip fuses, activating 631 confidentiality protection on copied secret values and the message signing private key register, activating 632 integrity protection on the message tag register, and authenticating 633 off-chip software using the trust anchor, and preventing use of the message signing logic unless the off-chip software is authenticated and contains a correct capability token.

In various embodiments, the method 635 of operating an electronic circuit can further include designing 636 a logic-embedded secret value into the electronic circuit, embedding 637 the logic-embedded secret value into electronic circuit logic, receiving 638 from the fabrication facility a non-volatile storage-embedded secret value, and embedding 639 the non-volatile storage-embedded secret value into non-volatile storage. The logic-embedded secret value is masked and etched into the electronic circuit logic and unknown and unknowable external to the electronic circuit. The non-volatile storage-embedded secret value is distinct and common to circuit-model copies of the electronic circuit and unknown and unknowable except by the electronic circuit and secure boot logic in on-chip masked ROM that is permanently read-only and cannot be updated. The method 635 of operating an electronic circuit can further include receiving 640 from an OEM one or more integrity-sensitive values, storing 641 the one or more integrity-sensitive values to the non-volatile storage in one or more circuit-model copies of the electronic circuit, receiving 642 an invocation signal from the OEM, and deriving 643, upon invocation by the OEM, the message signing private key. The one or more integrity-sensitive values are configured such that OEM-supplied software authentication via secure boot depends on the one or more integrity-sensitive values (e.g., trust anchor). The message signing private key is derived 643 from (1) the logic-embedded secret value, (2) the non-volatile storage-embedded secret value, and (3) the one or more integrity-sensitive values (e.g., trust anchor). The method 635 of operating an electronic circuit can further include storing 644 the derived message signing private key within the electronic circuit, invoking 645 public key generation and export for retention using one or more off-chip components, and exporting 646 the message signing public key generated to match the message signing private key for retention by the OEM for use in OEM pre-production.

In further embodiments and/or applications, the method 650 of operating an electronic circuit further includes receiving 651 an invocation signal from a contracted manufacturer, and deriving 652 the message signing private key upon invocation by the contracted manufacturer. The message signing private key is derived 652 from (1) the logic-embedded secret value, (2) the non-volatile storage-embedded secret value, and (3) the one or more immutable values (e.g., trust anchor). The method 650 of operating an electronic circuit can further include signing 653 data using the derived message signing private key for verification by the OEM, sending 654 the signed data to the OEM for authentication and verification of the signed data using the message signing public key, receiving 655 OEM sensitive data from the OEM, and storing 656 the OEM sensitive data in the non-volatile storage.

In some further embodiments, the method 660 of operating an electronic circuit can further include obtaining 661 authentication data dependent on a trust anchor, obtaining 662 a capability token that is authenticated and allows use of the private key derivation logic or message signing logic, and authenticating 663 an OEM server. The method 660 of operating an electronic circuit can further include establishing 664 a secure connection with the authenticated OEM server, and authenticating 665 the electronic circuit and software combination to the server using a protocol including invoking 666 the message signing logic to sign with a message signing private key a message including a message tag. The protocol can be a challenge/response protocol in which the OEM server supplies a nonce or timestamp that the message signing logic must include in the signed message. The method 660 of operating an electronic circuit can further include transferring 667 sensitive OEM data between the OEM server and electronic circuit over a secure connection after mutual authentication, and then using 668 the sensitive OEM data.

In other embodiments and/or applications, the method 670 of operating an electronic circuit can further include receiving 671 a circuit-specific logic-embedded secret value from a fabrication facility, embedding 672 the circuit-specific logic-embedded secret value into electronic circuit logic, receiving 673 a fuse-embedded secret value from the fabrication facility, and embedding 674 the fuse-embedded secret value into write-only fuses. The method 670 of operating an electronic circuit can further include receiving 675 integrity-sensitive information (e.g., trust anchor) from an OEM, storing 676 the integrity-sensitive information into the write-only fuses, and generating 677 the message signing private key. The message signing private key can be generated 677 from (1) the circuit-specific logic-embedded secret value, (2) the fuse-embedded secret value, and (3) the integrity-sensitive information (e.g., trust anchor). The method 670 of operating an electronic circuit can further include generating 678 the message signing public key corresponding to the message signing private key, and exporting 679 the message signing public key to the OEM for authenticating the electronic circuit and the integrity-sensitive information.

In some embodiments, the method 680 of operating an electronic circuit further includes receiving 681 a message from an OEM, authenticating 682 the security state of the electronic circuit, and digitally signing 683 the message for an authenticated electronic circuit. Authentication 683 prevents use of message signing logic in the electronic circuit unless the provisioning software is authenticated and contains the correct capability token for authorizing use and capability of the message signing logic. For example, the OEM server sends a message to the device, which authenticates the circuit and signs the message.

Figure 7:
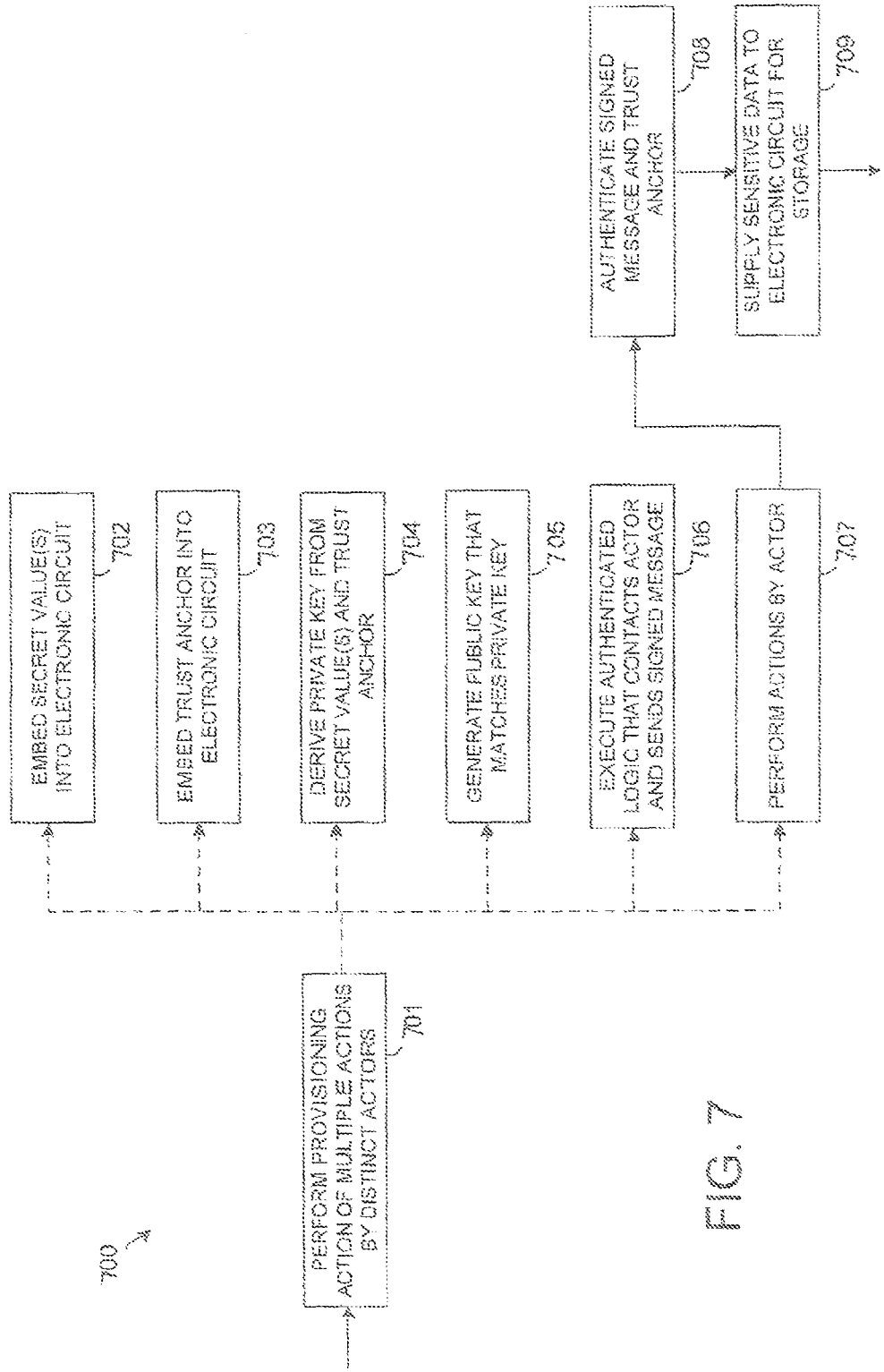
FIG. 7, including FIGS. 7.1, 7.2, 7.3, and 7.4, are schematic flow charts illustrating an embodiment or embodiments of a method of provisioning an electronic circuit that enables security of sensitive data in a design and manufacturing process that includes multiple parties.

FIG. 7, including FIGS. 7.1, 7.2, 7.3, and 7.4, are schematic flow charts illustrating an embodiment or embodiments of a method of provisioning an electronic circuit that enables security of sensitive data in a design and manufacturing process that includes multiple parties. In an illustrative embodiment, a method 700 of provisioning an electronic circuit includes performing 701 at least one provisioning action of a plurality of provisioning actions that are performed by a plurality of distinct actors. The plurality of provisioning actions include embedding 702 at least one secret value into the electronic circuit, embedding 703 a trust anchor into the electronic circuit, deriving 704 a message signing private key from the at least one secret value and the trust anchor, and generating 705 a message signing public key that matches the message signing private key. The plurality of provisioning actions further include executing 706 trust anchor-authenticated logic that contacts a predetermined actor of the plurality of distinct actors and communicates to the predetermined actor a message signed with the private key, and performing 707 actions by the predetermined actor including authenticating 708 the message and the trust anchor, and supplying 709 sensitive data to the electronic circuit for storage. The multiple distinct actors perform various aspects of electronic circuit provisioning. Examples of actors can include an entity (e.g., chip manufacturer 110, FIG. 1) that performs circuit design and fabrication or particular aspects of circuit design such as RTL design, ROM design, wafer fabrication, circuit test, and the like. Other actors can be OEMs (e.g., OEM 120, FIG. 1), manufacturers such as contracted manufacturers (e.g., product manufacturer 130, FIG. 1), and the like.

The message signing private key can be derived from (1) a logic-embedded secret value, (2) a non-volatile storage-embedded secret value specified by the fabrication facility, and (3) the one or more immutable values (e.g., trust anchor). The logic-embedded secret value is specified by a fabrication facility and is distinct and common to circuit-model copies of the electronic circuit and unknown and unknowable external to the electronic circuit. The non-volatile storage-embedded secret value is specified by the fabrication facility and is distinct and common to circuit-model copies of the electronic circuit and unknown and unknowable except by the electronic circuit and secure boot firmware.

In a further embodiment, the method 710 of provisioning an electronic circuit further includes generating 711 the one or more secret values for embedding into the electronic circuit. In other embodiments and/or applications, the method 715 of provisioning an electronic circuit further includes programming 716 into the electronic circuit a private key derivation function that derives the message signing private key from the at least one secret value and the trust anchor, and programming 717 into the electronic circuit a public key generation function that generates a message signing public key matching the message signing private key. In some embodiments, the method 720 of provisioning an electronic circuit further includes programming 721 into the electronic circuit a private key signature generation function that generates a signature for signing a message with the message signing private key. The actions of generating secret values and programming various functions into the electronic circuit can typically be performed by a circuit designer and/or fabricator although other actors such as OEMs and manufacturers can perform the operations in some arrangements.

In additional embodiments, the method 725 of provisioning an electronic circuit further includes generating 726 the trust anchor for embedding into the electronic circuit. In some embodiments and/or applications, the method 730 of provisioning an electronic circuit further includes invoking 731 a private key derivation function that is programmed into the electronic circuit and derives a message signing private key from the at least one secret value and the trust anchor and is known only to the electronic circuit, and invoking 732 a public key generation function that is programmed into the electronic circuit and generates a message signing public key matching the message signing private key. In an example provisioning arrangement, the OEM can generate the trust anchor for embedding into the electronic circuit, which can be performed by the OEM or, if suitable, by a design/fabrication facility or by a contracted manufacturer. Typically, the OEM can invoke the public key generation function that is programmed into the electronic circuit by the designer/fabricator.

In various embodiments, the method 735 of provisioning an electronic circuit further includes authenticating 736 the logic in the off-chip software 558 against the trust anchor, signing 737 a message with the message signing private key, contacting 738 a server, transmitting 739 the signed message to the server for authenticating the signed message and the trust anchor, receiving 740 sensitive data in response to authentication of the signed message and the trust anchor, and storing 741 the sensitive data in nonvolatile memory. In further embodiments and/or applications, the method 745 of provisioning an electronic circuit further includes receiving 746 at a server a message signed with the private key, authenticating 747 the signed message and the trust anchor, transmitting 748 sensitive data in response to authentication of the signed message and the trust anchor. The actions of authenticating the signed message against the trust anchor and exchanging messages between the integrated circuit and a server can be performed by an OEM, for example using an OEM server, to ensure that data is exchanged only in a certified manner.

In some further embodiments, the method 750 of provisioning an electronic circuit further includes receiving 751 the trust anchor, embedding 752 the received trust anchor into the electronic circuit, invoking 753 execution of the logic in the off-chip software 558 that contacts a server and communicates to the server a message signed with the message signing private key that is known only to the electronic circuit and derived from the at least one secret value and the trust anchor, receiving 754 sensitive data sent by the server in response to authentication by the server of the signed message and the trust anchor, and storing 755 the sensitive data in nonvolatile memory. An actor such as a contracted manufacturer can receive the trust anchor from an OEM and, during manufacture of a product that contains an electronic circuit, invoke execution of logic that contacts an OEM server and sends a signed message to the server. The OEM can authenticate the message and, in response, send sensitive data that is stored in the product to ensure that the sensitive data is only installed into the product if authorized.

In a further embodiment, the method 760 of provisioning an electronic circuit further includes invoking 761 the trust anchor-authenticated logic to contact a server, transmitting 762 to the server a message signed with the message signing private key that is known only to the electronic circuit and derived from the at least one secret value and the trust anchor, and supplying 763 server-sensitive data to the electronic circuit. In other embodiments and/or applications, the method 765 of provisioning an electronic circuit further includes signing 766 a message with the message signing private key that is known only to the electronic circuit and derived from the at least one secret value and the trust anchor, sending 767 the signed message to a server, invoking 768 the server to authenticate the signed message and the trust anchor, and to send server-sensitive data to the electronic circuit, and invoking 769 storage of the supplied server-sensitive data to nonvolatile memory. A contracted manufacturer can invoke logic that has been authenticated using the trust anchor, for example by an OEM, and contacts an OEM server to enable receipt of OEM-sensitive data and storage of the OEM-sensitive data into a product.

Figure 8:
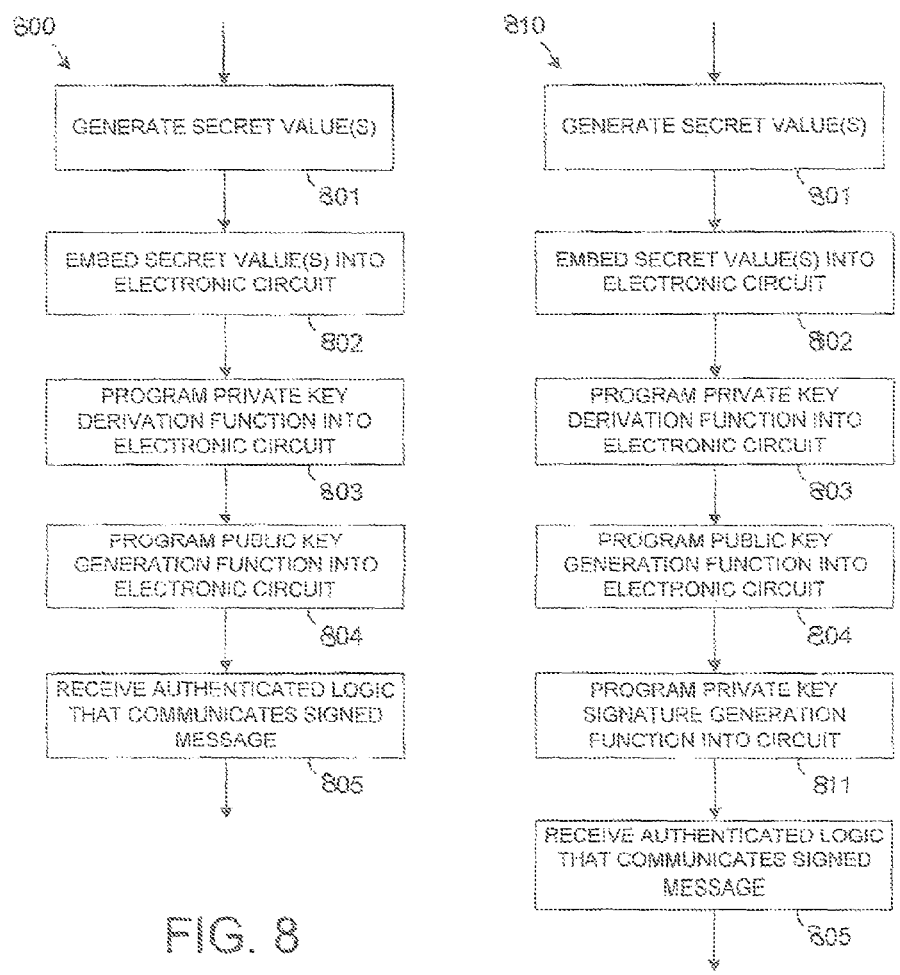
FIG. 8 includes schematic flow charts depicting an embodiment or embodiments of a method of operating a production system that enables security of sensitive data in a design and manufacturing process that includes multiple parties.

FIG. 8 is a schematic flow chart showing an embodiment or embodiments of a method of operating a production system that enables security of sensitive data in a design and manufacturing process that includes multiple parties. The production system actions generally pertain to a circuit design and fabrication facility of the multiple parties. In an illustrative embodiment, a method 800 of operating a production system includes generating 801 (e.g., by chip manufacturer 110, FIG. 1) at least one secret value, embedding 802 the one or more secret values into the electronic circuit, and programming 803 into the electronic circuit a private key derivation function that derives the message signing private key from the at least one secret value and a trust anchor. The method 800 of operating a production system further includes programming 804 (e.g., by chip manufacturer 110, FIG. 1) into the electronic circuit a public key generation function that generates a message signing public key matching the message signing private key, and receiving 805 for execution (e.g., by product manufacturer 130, FIG. 1) trust anchor-authenticated logic (e.g., off-chip software 558, FIG. 5) that contacts a predetermined actor of the plurality of distinct actors (e.g., OEM 120, FIG. 1) and communicates to the predetermined actor a message signed with the message signing private key. In a further embodiment, the method 810 of operating a production system can further include programming 811 into the electronic circuit a private key signature generation function that generates a signature for signing a message with the message signing private key. In an example configuration, the provisioning actions of embedding values such as cryptographic information, secret values and the like, and programming logic such as cryptographic functions can be performed by a circuit designer and/or fabricator (e.g., chip manufacturer 110, FIG. 1).

FIG. 9, including FIG. 9.1, depicts schematic flow charts showing an embodiment or embodiments of a method of provisioning an electronic circuit that enables security of sensitive data in a design and manufacturing process that includes multiple parties. The provisioning actions generally pertain to an OEM facility of the multiple parties. In an illustrative embodiment, a method 900 of provisioning an electronic circuit includes generating 901 a trust anchor, embedding 902 the trust anchor into the electronic circuit, invoking 903 derivation of a message signing private key from at least one secret value embedded into the electronic circuit and the trust anchor, and invoking 904 generation of a message signing public key that matches the message signing private key. The method 900 of provisioning an electronic circuit further includes supplying 905 to the electronic circuit trust anchor-authenticated logic (e.g., off-chip software 558, FIG. 5) that contacts a server (e.g., a server of OEM 120, FIG. 1) and communicates to the server a message signed with the private key, authenticating 906 the message and the trust anchor, and supplying 907 sensitive data to the electronic circuit for storage.

The trust anchor can be a fuse-embedded value that can, in various ways, be maintained as distinct and common to circuit-model copies of the electronic circuit. For example, the OEM can choose that every device having the same part number have exactly the same trust anchor. So when chips are sent to a contracted manufacturer (e.g., product manufacturer 130, FIG. 1) to build instances of a certain device at the request of an OEM and an equivalent block of chips are sent to a different contracted manufacturer to make additional instances of that same device at the request of the same OEM, the trust anchors on all of the chips are the same. The OEM can request that the contracted manufacturer program a known value (e.g., the trust anchor or SRKH) into fuses in the device which can have one or more secrets originally embedded into the chips, the one or more secrets and the known value programmed by the contracted manufacturer can be combined to form a message signing private key that is distinct to the OEM. The chips are thus customized for each OEM. The OEM signs a code image that the OEM intends to be run on the manufactured device and the OEM requests the manufacturer to place that code image into the manufactured device. The code signing private key for signing the code image is held in secret by the OEM, thus ensuring that only the OEM can sign code images using that code signing private key. The device, at bootstrap loading, first executes the internal ROM code which verifies that the signed code image is correct by checking the digital signature on the code image. The code signing public key for verifying the code image can be burned into fuses on the device as the trust anchor. If the signature over the code image does not verify correctly using the trust anchor that was programmed by the contracted manufacturer, the internal ROM code will not allow the code image to be executed. So once the correct trust anchor is blown into fuses on the device, the device will only run code that has been properly signed by the OEM. The trust anchor that is burned into the fuses is a public value that is available to anyone, but is integrity-protected so that modification of the value is not permitted. Once the trust anchor is entered, the fuses are locked for writing and burning of additional bits into that block of fuses is not possible. Thus an OEM-unique public value is blown into the fuses by a contracted manufacturer, and the OEM-unique public value can be used along with the secret to generate an OEM-specific message signing private key. Public key cryptography can use a private key for signing and a public key that is usable by the public to verify the signature. The code signing public key as the trust anchor is entered into every chip that runs the OEM's signed code image and enables verification that the code image is correct.

The signed code image is signed at one place, the OEM trusted pre-production facility, and can be verified on any chip.

The OEM ensures that the contracted manufacturer has blown the correct trust anchor by forcing the manufactured device to contact the OEM's server to obtain crucial secret information (e.g., sensitive production code). The crucial secret information is chosen such that a significant feature of the manufactured device will be inoperable without knowledge of this crucial secret information. This crucial secret information could be cryptographic keys needed to communicate with other products, or could be crucial parts of the software, or the like. The OEM's server will supply the needed crucial secret information to the manufactured device only if a properly signed message is received from the manufactured device. The OEM server verifies the signature over the message received from the manufactured device using the message signing public key that matches the message signing private key derived on the manufactured device. Since the electronic circuit within the manufactured device derives the message signing private key, in part, from the trust anchor that was burned into fuses by the contracted manufacturer, the message signing private key, and hence the signature over the signed message, will be correct only if the contracted manufacturer burned the correct trust anchor into fuses. Since the trust anchor was used both in verifying the booted code image and in deriving the private message signing key, if the signature over the signed message verifies correctly the OEM server can be assured that the manufactured device is running a boot image that was signed by the OEM. Knowing that the manufactured device is running OEM software, the OEM can be assured that supplying the crucial secret information to the manufactured device is safe and appropriate because the running software will properly safeguard that crucial secret information.

In other embodiments and/or applications, the method 910 of provisioning an electronic circuit can further include invoking 911 a private key derivation function that is programmed into the electronic circuit and derives a message signing private key from the at least one secret value and the trust anchor and is known only to the electronic circuit, and invoking 912 a public key generation function that is programmed into the electronic circuit and generates a message signing public key matching the message signing private key. In some embodiments, the method 915 of provisioning an electronic circuit can further include receiving 916 a message that is signed with the message signing private key from the electronic circuit, authenticating 917 the trust anchor-authenticated logic against the trust anchor, and transmitting 918 sensitive data (e.g., sensitive production code) available in response to authentication of the signed message and the trust anchor to the electronic circuit for storage in nonvolatile memory. In additional embodiments, the method 925 of provisioning an electronic circuit further includes receiving 926 at the server a message signed with the message signing private key, authenticating 927 the signed message and the trust anchor, and transmitting 928 sensitive data in response to authentication of the signed message and the trust anchor.

The trust anchor identifies to the OEM that the electronic circuit is properly configured for the OEM and therefore runs the OEM software. The trust anchor is mixed into the generation of the message signing private key that is used for authentication. The trust anchor, as mixed into the message signing private key, is bound into the message implicitly. The secret value that is put into the chip and the message signing private key are two different values. The secret is mixed with the trust anchor to generate the message signing private key. In other embodiments and/or applications, the trust anchor does not have to be mixed into the private key but can be a mandatory component of the message that is signed and so is bound to the message explicitly with similar effect to implicit binding. Thus the secret in the chip is the message signing private key, is programmed directly into the chip, and no mixing occurs. In this alternative, the secret in the chip, rather than being mixed via a key derivation function to generate the message signing private key, can be used directly as the message signing private key. Then, every time a message is signed, a unique identifier and the trust anchor can be appended, ensuring that the trust anchor is included as part of the signature for the message. In summary, the trust anchor can be mixed into the message signing private key, or can be mixed into the generation of the signature, or both. In either case, the trust anchor is included to cause the signature to be different on parts for different OEMs.

For the OEM's protection, an OEM-specific private key can be entered into every chip, enabling the OEM to authenticate the chip because a secret used to derive the message signing private key is entered only into the proper chips. The secret value is placed into the chip either in logic, fuses, or ROM code. The secret value is unknown to any party and is combined with the trust anchor placed by a contracted manufacturer for the OEM onto the chip as the public value that is integrity-protected. Both of the secret value in logic or fuses and the trust anchor in the fuses are integrity-protected and are incapable of modification by any party. The public can read the trust anchor, but no party can read the secret value. The secret value and trust anchor are combined in a function called a key derivation function to generate a message signing private key that is unique to the chip running with the trust anchor. When the message signing private key is generated, the corresponding message signing public key is also generated and can be stored off the chip. The message signing private key can be stored in a register inside the chip and is locked to prevent reading other than by the cryptographic module. When the chip bootstrap loads, the message signing private key generated from the secret and the trust anchor becomes available internally, and the message signing public key is made available to the world. The OEM has access to the public value and can request the manufacturer to load the proper trust anchor into every chip that is made for the OEM's product. If the manufacturer follows the instructions of the OEM and blows the proper trust anchor into the fuses, each chip at each bootstrap load will produce the same message signing private key repeatedly at every bootstrap load operation. The message signing public key is known to the world because, once generated, the message signing public key does not change because the message signing private key does not change. The chip running proper provisioning software from the OEM can contact the OEM over a network. The OEM can give a message to the chip. The chip then signs the message using the chip's message signing private key which is unknown by any party, even the OEM. The message signing private key is internally generated and unknown to anyone. All that is known is that the message signing public key corresponding to the message signing private key is held by the OEM. After the chip has signed the message with the message signing private key, the chip sends the signed message to the OEM. The OEM can then verify the message with the known message signing public key. If the message verifies and is thus authenticated, then the OEM verifies several conditions including: (1) the chip is authorized and is from the correct circuit designer/fabricator (e.g., chip manufacturer 110, FIG. 1), (2) the manufacturer (e.g., product manufacturer 130, FIG. 1) has blown the proper trust anchor into the chip so that the chip can now run code only provided by the OEM (e.g., OEM 120, FIG. 1), (3) the OEM has generated the proper signature for the system code image that is running, and has booted securely, and (4) the chip can generate a Virtual Private Network (VPN) tunnel-secure communication link with the OEM and the OEM can download sensitive data into the product containing the chip.

If the manufacturer attempts to cheat and place a different trust anchor into the chip, most likely the manufacturer's own trust anchor, meaning that the manufacturer would have the private key to sign code and cause the product to run the manufacturer's code rather than the OEM's code, the message signing private key generated and held in the register internal to the chip would be an incorrect message signing private key. Thus, when the chip communicates with the OEM and signs a message for the OEM, the signature would be incorrect and the OEM would find that the manufacturer put the wrong trust anchor into the chip. The OEM thus has information to avoid injecting additional sensitive data into the chip. The OEM can verify, essentially trust and verify, trusting the manufacturer to comply with contractual specifications about embedding the trust anchor in the chip to enable verification. Once the proper trust anchor is in the chip, the OEM is assured that the chip will only run code supplied by the OEM. Thus, when the product communicates with the OEM, the OEM is assured that the code is proper and authorized. When the OEM downloads sensitive data and code onto the chip, software of the OEM is assured to use and protect the sensitive data properly, preventing the manufacturer from improperly using manufacturer's code to download and reveal the sensitive data or to bypass security of the sensitive data. Accordingly, embodiments of the disclosed system, components, and techniques ensure that the trust anchor, as a public value, is correctly embedded in the product, allowing the OEM to inject the OEM secret into the chip in which, without the OEM secret, the product cannot run correctly. The manufacturer is prevented from creating additional clones of the product that do not contain the secret.

Figure 10:
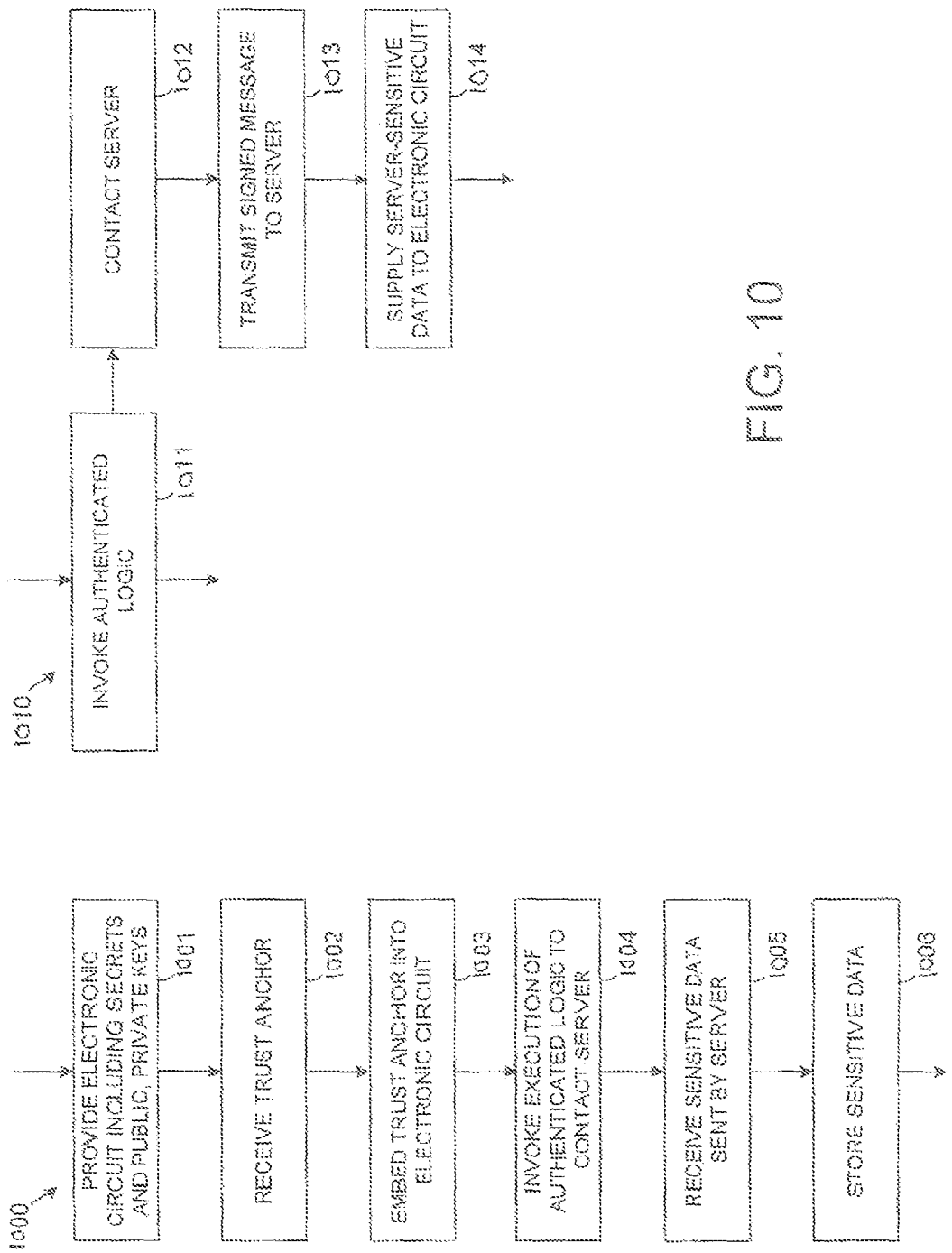
FIG. 10, including FIG. 10.1, illustrates schematic flow charts showing an embodiment or embodiments of a method of provisioning an electronic circuit that enables security of sensitive data in a design and manufacturing process that includes multiple parties in which provisioning actions generally pertain to a contracted manufacturer facility of the multiple parties.

FIG. 10, including FIG. 10.1, illustrates schematic flow charts showing an embodiment or embodiments of a method of provisioning an electronic circuit that enables security of sensitive data in a design and manufacturing process that includes multiple parties. The provisioning actions generally pertain to a contracted manufacturer facility of the multiple parties (e.g., product manufacturer 130, FIG. 1). In an illustrative embodiment, a method 1000 of provisioning an electronic circuit includes providing 1001 the electronic circuit including at least one embedded secret value, a message signing private key derived from the at least one secret value and a trust anchor, and a message signing public key that matches the private key. The method of provisioning 1000 the electronic circuit further includes receiving 1002 the trust anchor, embedding 1003 the received trust anchor into the electronic circuit, and invoking 1004 execution of the trust anchor-authenticated logic that contacts a server and communicates to the server a message signed with the message signing private key that is known only to the electronic circuit and derived from the at least one secret value and the trust anchor. The method of provisioning 1000 the electronic circuit further includes receiving 1005 sensitive data sent by the server in response to authentication by the server of the signed message and the trust anchor, and storing 1006 the sensitive data in nonvolatile memory.

In some embodiments and/or applications, the method 1010 of provisioning an electronic circuit further includes invoking 1011 the trust anchor-authenticated logic to contact 1012 a server, transmit 1013 to the server a message signed with the message signing private key that is known only to the electronic circuit and derived from the at least one secret value and the trust anchor, and supply 1014 server-sensitive data to the electronic circuit. In various embodiments, the method 1020 of provisioning an electronic circuit further includes signing 1021 a message with the message signing private key that is known only to the electronic circuit and derived from the at least one secret value and the trust anchor, sending 1022 the signed message to a server, and invoking 1023 the server to authenticate 1024 the signed message and the trust anchor, and to send 1025 server-sensitive data to the electronic circuit. The method 1020 of provisioning an electronic circuit further includes invoking 1026 storage of the supplied server-sensitive data to nonvolatile memory.

Embodiments of the illustrative system address interactions between multiple parties. In an example arrangement, four parties can be involved including an electronic chip designer and/or fabricator, an OEM (e.g., OEM 120, FIG. 1) that makes available a product that includes electronic chips from the electronic chip designer and/or fabricator (e.g., chip manufacturer 110, FIG. 1), a contracted manufacturer under contract to the OEM (e.g., product manufacturer 130, FIG. 1), and an end user or final customer. The contracted manufacturer typically receives the chip from the fabricator directly, not through the OEM. Otherwise, if the OEM can handle the chip, other techniques can be used to enable verifying the contracted manufacturer. The illustrative arrangement assists the OEM and manufacturer. The OEM may not trust the manufacturer because the manufacturer may reverse engineer the design and build a product without authorization. The manufacturer may sell sensitive data of the product to a third party. The manufacturer may be contracted to build a specified number of devices for the OEM but in reality may make a larger number while sending the specified number of devices back to the OEM, selling extra devices on the black market or gray market. The OEM does not necessarily have the greatest level of trust of the manufacturer so the OEM may desire to ensure that the manufacturer abides by the contract. The OEM desires to be able to verify actions of the manufacturer.

Embodiments of the disclosed system, components, and techniques enable the OEM to inject some type of sensitive data into the end product that the manufacturer builds without the manufacturer being able to determine or modify the sensitive data. In various embodiments, the sensitive data can be a secret key, an encrypted code image, and/or a device driver that has to operate exactly as specified or otherwise the product does not work. In other embodiments, the sensitive data may be a token to enable specific high-value features of the product. A suitable secret is sufficient if capable of preventing the manufacturer from making an unauthorized copy. Each time the OEM injects the sensitive data into a product, the system and technique can enable an audit that determines whether the manufacturer is in compliance with the contract and, if the manufacturer has overproduced a product, the violation can be detected. The illustrative system and techniques thus enable the OEM to verify that the manufacturer is in compliance with certain aspects of the contract.

One method for usage by an OEM in injecting sensitive data onto a chip is programming of a fuse box, a block of fuses within which a fabricator can blow a secret key or known value. For example, the fuses can be programmed with a trust anchor. In other arrangements, the electronic circuit can include a bank of hash values that are programmable by the OEM. The OEM can enter a desired value onto the chip.

If the OEM buys the chip from a chip designer/fabricator, the OEM can request programming of a secret into the fuses before the chip is shipped to the manufacturer. The fabricator secret is in every chip for all OEMs. The trust anchor differentiates between different OEMs. The fabricator sends chips directly to the manufacturer, who embeds the trust anchor. When the set of chips are received by the manufacturer, the manufacturer can enter the trust anchor into the product and the product will only run if the trust anchor is correctly programmed Embodiments of the disclosed system and technique thus ensure that the manufacturer does not build too many devices.

Embodiments of the design process can enable different parties to inject secrets and public values at different points. For example, some arrangements can enable the OEM to not touch the integrated circuit chip from a fabricator/designer and thus to not embed a secret. Otherwise, the OEM can embed a secret before sending the chip to a contracted manufacturer. The techniques disclosed herein enable the OEM to exploit a secret embedded by the fabricator/designer without receiving the chip. In other arrangements, a chip designer/fabricator can send chips to the OEM, the OEM can burn the secret into the chip without knowledge of the chip designer/fabricator, and the OEM can send the chips to further parties in the process. In another arrangement, the OEM can request the chip designer/fabricator to enter the secret pattern onto chips and to send the chips to the manufacturer.

Figure 11:
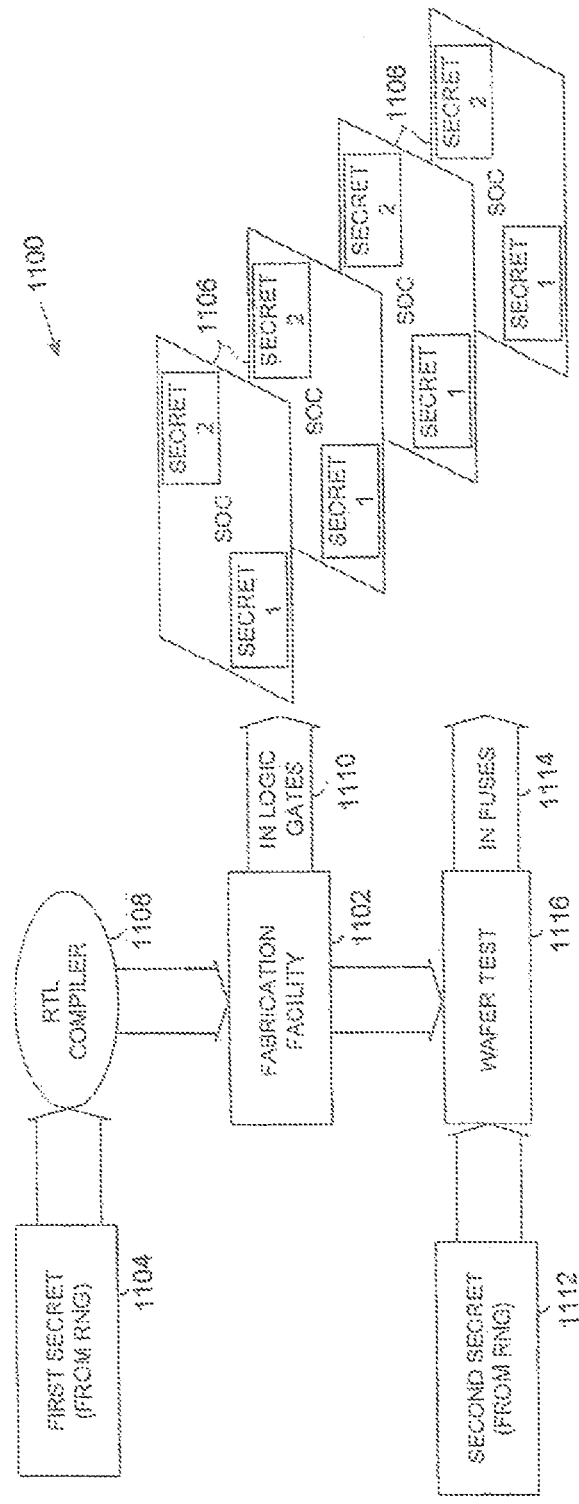
FIG. 11 is a schematic block diagram illustrating components of the design and manufacturing process at the stage of design and production of the SOC.
Figure 12:
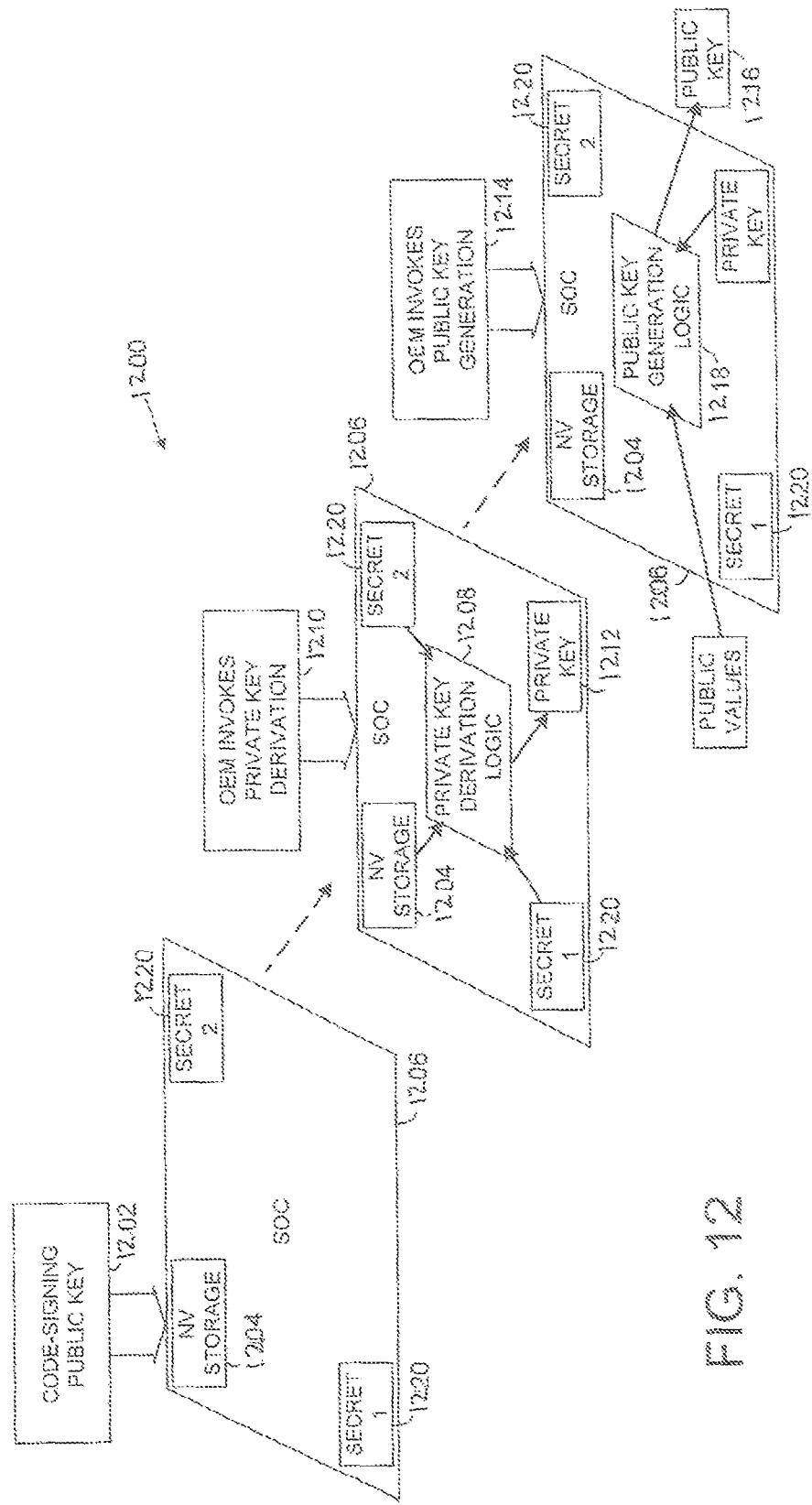
FIG. 12 is a schematic block diagram showing components of the design and manufacturing process at the stage performed at an OEM's facility.
Figure 13:
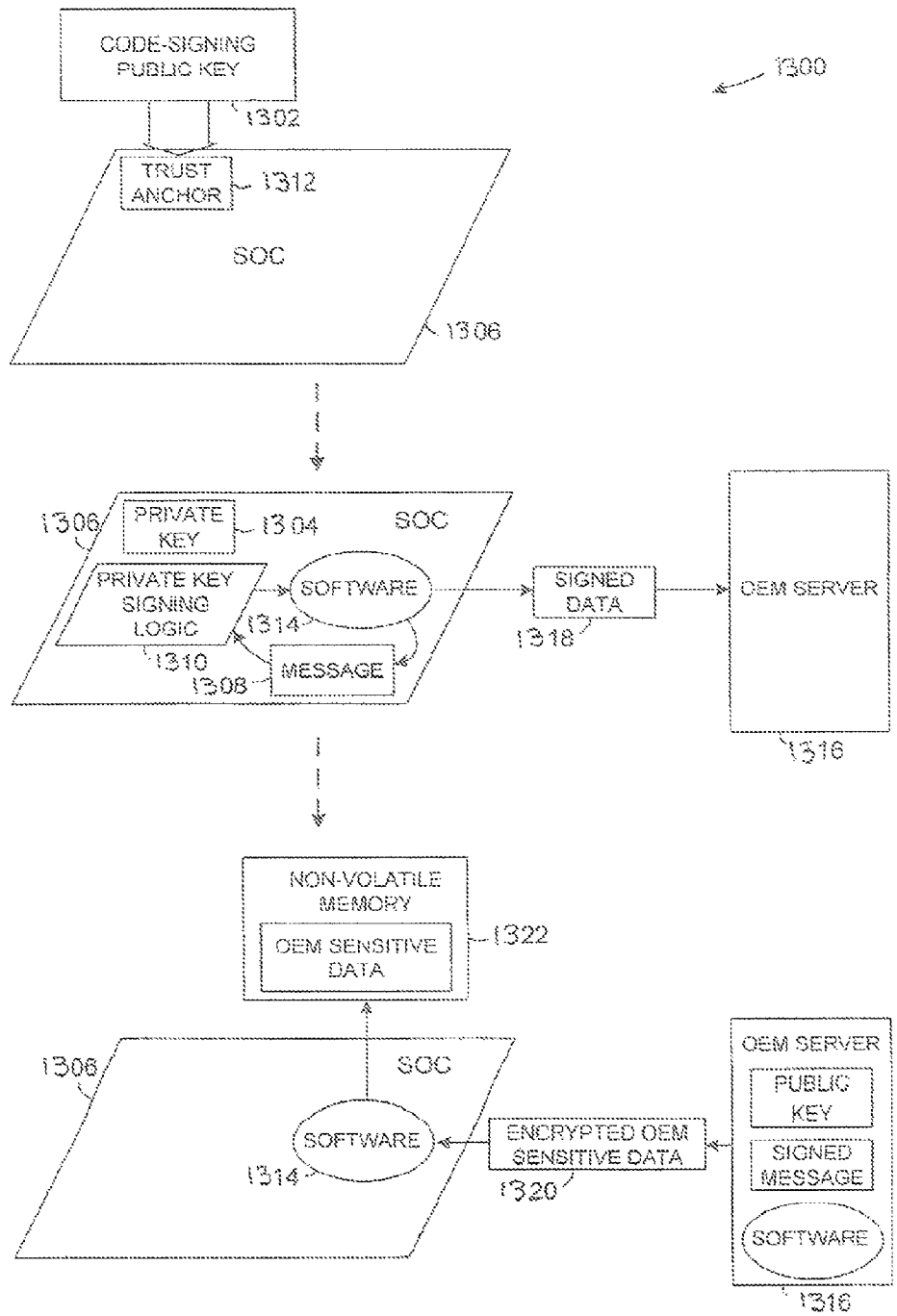
FIG. 13 is a schematic block diagram depicting components of the design and manufacturing process at the stage performed at a contracted manufacturer's facility to customize each chip to the OEM's specifications.

Embodiments of a design and manufacturing process for electronic products that includes multiple parties enables security of sensitive data in a possibly untrusted environment. Components of the system and electronic circuits can include (1) a message signing private key embedded within a System on a Chip (SOC), (2) elements within the SOC capable of generating a message signing public key to match the private key, and (3) elements for signing certain messages with the message signing private key. The message signing private key is derived from several components at least one of which is known only to the hardware, and at least one of which resides in non-volatile storage on the SOC. FIGS. 11, 12, and 13 illustrate how components interact at various stages in the design and manufacturing process to accomplish the goal of securely provisioning devices within an untrusted environment.

Referring to FIG. 11, a schematic block diagram illustrates components of the design and manufacturing process at the stage 1100 of design and production of the SOC. At the SOC design and fabrication facility 1102 (e.g., a facility of chip manufacturer 110, FIG. 1), a common secret value 1104 is built into the hardware of every copy 1106 of an SOC. The secret value 1104 can be applied at the fabrication facility 1102 via an RTL compiler 1108. The secret value 1104 is applied to logic gates 1110 of the SOC copies 1106 and is to be completely unknown and unknowable outside the hardware. At the SOC design and fabrication facility 1102, another secret value 1112 is burnt into fuses 1114 within every copy 1106 of an SOC, for example at wafer test 1116. The secret value 1112 is preferred to be completely unknown and unknowable except by hardware and secure boot firmware.

Referring to FIG. 12, a schematic block diagram illustrates components of the design and manufacturing process at the stage 1200 performed at an OEM's facility (e.g., a facility of OEM 120, FIG. 1). The OEM performs several steps on a chip to customize the message signing private key and obtain a matching message signing public key. At the OEM facility, one or more immutable values such as a code signing public key 1202 are placed in non-volatile storage 1204 within one or more copies 1206 of that same SOC. The OEM customizes the message signing private key by adding the public code signing public key 1202 stored in non-volatile memory as a trust anchor 1204 on the chip 1206. The OEM invokes 1210 private key derivation logic 1208 on the SOCs 1206 that derive the message signing private key 1212 from the one or more secret values in hardware 1220 and the values in non-volatile storage 1204, and invokes the public key generation logic 1214 to generate the matching message signing public key 1216. Accordingly, the OEM invokes 1210 the private key derivation function 1208 that is built into the chip 1206. The OEM also invokes 1214 the public key generation function 1218 built into the chip 1206 to obtain the matching message signing public key 1216. The message signing public key 1216 is exported from the SOC 1206 and is retained by the OEM.

In some embodiments, the OEM may be unable or may desire not to perform the disclosed operations and arrange for the device designer/fabricator (e.g., chip manufacturer 110, FIG. 1) to perform the operations of both FIGS. 11 and 12 and send the devices to the contracted manufacturer, either directly or through a distributor. The situation is common for OEMs without the capability of blowing fuses, for example. A common and simple arrangement is for the contracted manufacturer not to obtain parts from the OEM or the circuit designer/fabricator, but rather from a distribution channel in which case every chip is identical to every other chip and neither the circuit designer/fabricator nor the OEM can burn the trust anchor into the fuses.

Thus the contracted manufacturer can be permitted to blow the trust anchor pattern into the fuses, but with the consequence that the contracted manufacturer can change the pattern that is blown into the fuses or can blow the same trust anchor pattern into extra chips. Embodiments of the disclosed system and techniques prevent the contracted manufacturer from changing the trust anchor or provisioning additional devices. The contracted manufacturer is thus forced to blow the correct trust anchor, a non-secret pattern, into the fuses of the devices such that the device will only work if the proper trust anchor is blown into the fuses. Only a chip that has the proper trust anchor can attain the sensitive data that the OEM wants injected into the product. The contracted manufacturer may be able to blow an alternative trust anchor and have the associated logic functioning, but then the SOC will not be able to identify or authenticate to the server to attain the OEM's sensitive data. The contracted manufacturer is denied full control over every device and cannot violate the contract, enabling the circuit designer/fabricator to sell the chip through a distribution channel and yet prevent the contracted manufacturer from violating the contract with the OEM.

Referring to FIG. 13, a schematic block diagram illustrates components of the design and manufacturing process at the stage 1300 performed at a contracted manufacturer's facility (e.g., a facility of product manufacturer 130, FIG. 1) to customize each chip to the OEM's specifications. At the contracted manufacturing facility 1300, the manufacturer customizes each SOC chip 1306 by burning the OEM's code signing public key 1302 into fuses as a trust anchor 1312. Logic 1310 is invoked that derives a message signing private key 1304. The message signing private key 1304 is used to sign message data 1308 with the trust anchor 1312 and possibly a chip-unique identifier such as a serial number. The chip 1306 executes OEM-supplied software 1314 that is authenticated against the trust anchor 1312. The OEM-supplied software 1314 contacts the OEM's server 1316 and delivers a message, possibly along with the trust anchor and chip-unique identifier, signed with the message signing private key 1304. The signed data 1318 is sent to the OEM which authenticates the signature using the message signing public key and verifies the signed data. The server 1316 authenticates the message and trust anchor and supplies the OEM sensitive data to the chip 1306, which can store the encrypted sensitive data 1320 in non-volatile memory 1322.

OEMs desire assistance in the use of contracted manufacturers that the OEM does not trust. The OEMs are fearful of over production by the manufacturer, or the manufacturer releasing design secrets to third parties. The illustrative system and components enable an OEM to use an untrusted contracted manufacturer, for example an untrusted overseas contracted manufacturer, enabling a reduction in cost in comparison to use of a trusted contracted manufacturer. When using an untrusted contracted manufacturer, the OEM is exposed to the risk that the contracted manufacturer may produce "overruns" of the OEM's devices by buying additional chips. The OEM also is exposed to the risk that the contracted manufacturer will run unauthorized software that contacts the OEM's server and obtains and mishandles the OEM's sensitive data. Some embodiments of the illustrative system and technique can use a split private key for protecting secret information within the private key in addition to customization of the private key by inclusion of the trust anchor. Embodiments of the disclosed system and technique embed a private key split into silicon and combine the embedded private key with one or more other splits stored in non-volatile storage on the chip. By changing the split(s) in non-volatile storage, the private key can be customized for each customer, and can be changed when desired. The corresponding message signing public key is used to authenticate the chip and sensitive customer data during chip customization at an untrusted manufacturing facility.

The secrets can be entered to the electronic circuit into multiple, for example three, different pieces to make reverse engineering more difficult. The multiple secrets in combination form a single secret that is in the electronic circuit. The secret is entered onto the circuit to perform the protocol. Splitting the secret protects the secret. Combining the secrets of the device designer/fabricator (e.g., chip manufacturer 110, FIG. 1) and the trust anchor of the OEM facilitates the protocol. The OEM code signing public key is embedded as the trust anchor in an embedding action performed by the contracted manufacturer on behalf of the OEM. The OEM code signing public key can be embedded directly as the trust anchor by the contracted manufacturer, or a shorter hash of the code signing public key may be embedded as the trust anchor.

In various embodiments, the secrets can be burned into a block of fuses that can be locked and are not readable. In other implementations, the secrets can be embedded into ROM code, in a block of ROM that can be read only at boot time and locked into a region of ROM code that can no longer be read. In further arrangements, the secrets can be secured as part of the packaging method in which a secret component can be maintained in a second chip in the same package. The secret can be entered any place on the chip with no limitation on how the secret is split as long as the full secret comes together within the package that travels through various distribution channels to the contracted manufacturer. In further embodiments, the secret and secret components can be stored in a battery-backed set of registers with a battery in the chip maintaining the flip-flops running even when the chip is powered off, acting as a set of fuses that can be programmed and maintained.

Figure 14:
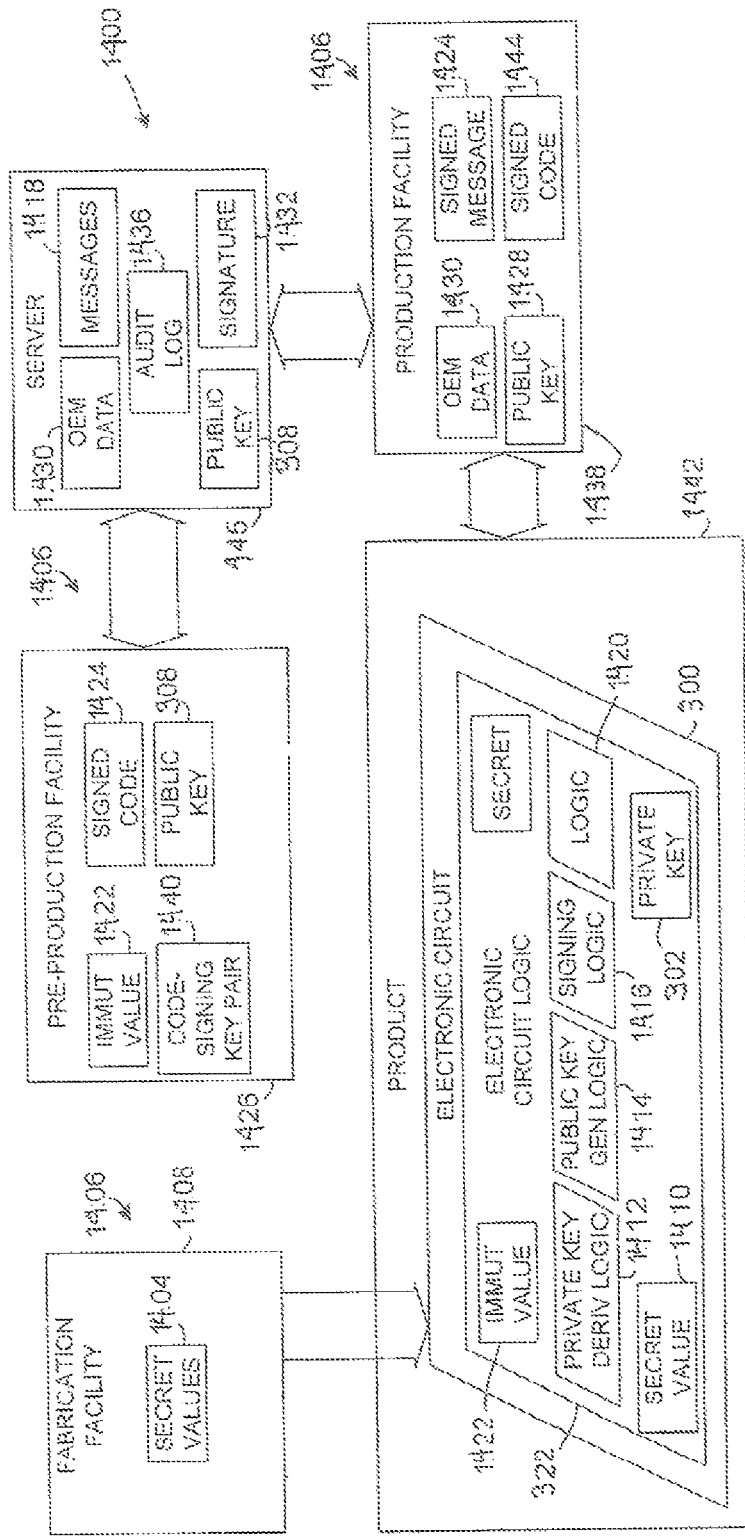
FIG. 14 is a schematic block diagram illustrating an embodiment of a production system that facilitates secure provisioning of circuits, systems, and devices in a potentially untrusted environment.

Referring to FIG. 14, a schematic block diagram depicts an embodiment of a production system 1400 that facilitates secure provisioning of circuits, systems, and devices in a potentially untrusted environment. An embodiment of a production system 1400 can include a facility 1408 that generates one or more secret values of a plurality of secret values 1404 that are generated by a plurality of distinct actors 1406 and enters the at least one secret value of the plurality of secret values 1404 into electronic circuit logic 322 at different stages of production of an electronic circuit 300.

In various embodiments, the production system 1400 can further include a fabrication facility 1408 that designs at least one secret value 1404 into the electronic circuit 300 such that instances of the electronic circuit 300 hold an identical secret value 1410. The fabrication facility 1408 fabricates the electronic circuit 300 incorporating logic 1412 that derives a message signing private key 302 from the identical secret value 1410, logic 1414 that generates a message signing public key 308 that matches the message signing private key 302, and logic 1416 that signs messages 1418 with the message signing private key 302. In particular embodiments, the fabrication facility 1408 can be configured to fabricate the electronic circuit 300 to further include logic 1420 that incorporates an immutable value 1422 into the signed message 1424 such that the immutable value 1422 is selected from a group including a code signing public key, a hash of the code signing public key, a chip-unique identifier such as a serial number, and the like.

In other embodiments, the production system 1400 can further include a trusted pre-production facility 1426 that generates a code signing key pair 1440, signs code using the private key from the code signing key pair 1440, uses the electronic circuit 300 to create a message signing key pair, including message signing private key 302 and a matching message signing public key 308 based on the at least one secret value, retains the message signing public key 308, and operates a server 445. Aspects of operating the server 445 can include holding OEM sensitive data 1430, verifying a signature 1432 over messages 1418 using the message signing public key 308, and sending OEM sensitive data 1430 to a production facility 1438. In more particular example embodiments, the production system 1400 can further include the trusted pre-production facility 1426 that further embeds an immutable value 1422 (e.g., trust anchor) into at least one instance of the electronic circuit 300, causing the electronic circuit 300 to generate a message signing key pair, including message signing private key 302 and the corresponding message signing public key 308. The trusted pre-production facility 1426 also can retain the message signing public key 308. In various embodiments, the production system 1400 can be configured such that the trusted pre-production facility 1426 further maintains an audit log 1436 that records messages 1418. In further embodiments, the production system 1400 can be configured such that the trusted pre-production facility 1426 further maintains an audit log 1436 that records unique identifiers from messages 1418. In some applications and/or embodiments, the production system 1400 can be configured such that the trusted pre-production facility 1426 further causes the electronic circuit 300 to authenticate the pre-production facility 1426.

In some embodiments and/or applications, the production system 1400 can further include an untrusted production facility 1438 that embeds a public key 1428 from a code signing key pair 1440 into individual instances of a fabricated electronic circuit 300 as the immutable value 1422 such as a trust anchor, embeds a code signed by a private key from the code signing key pair 1440 into individual instances of a product 1442 incorporating the fabricated electronic circuit 300, and executes the signed code 1444. Execution of the signed code 1444 causes the electronic circuit 300 to sign messages 1418 using the message signing private key 302 generated within the electronic circuit 300, and send the signed message 1424 to the server 445. In a further embodiment, the production system 1400 can be configured such that the untrusted production facility 1438 further receives OEM sensitive data 1430 from the server 445. In particular example embodiments, the production system 1400 can be configured such that the untrusted production facility 1438 further causes instances of the fabricated electronic circuit 300 to sign a message 1418 that includes a chip-unique identifier for the individual instances of the fabricated electronic circuit 300.

Figure 15:
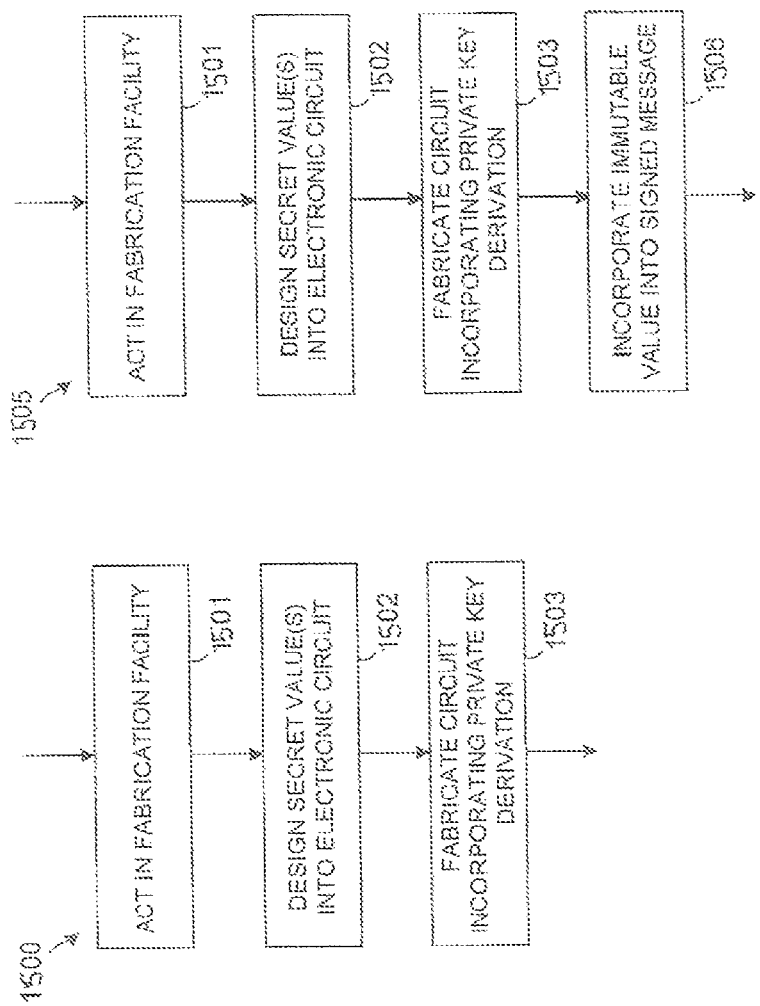
Referring to FIG. 15, including FIGS. 15.1, 15.2, and 15.3, are schematic flow charts showing an embodiment or embodiments of a method of provisioning an electronic circuit in a potentially untrusted environment.

Referring to FIG. 15, including FIGS. 15.1, 15.2, and 15.3, are schematic flow charts showing an embodiment or embodiments of a method of provisioning an electronic circuit in a potentially untrusted environment. An embodiment of the method 1500 of provisioning an electronic circuit can further include acting 1501 in a fabrication facility, designing 1502 at least one secret value into the electronic circuit such that instances of the electronic circuit hold an identical secret value, and fabricating 1503 the electronic circuit incorporating logic that derives a message signing private key from the identical secret value, logic that generates a message signing public key that matches the message signing private key, logic that signs messages with the message signing private key. In a further embodiment, the method 1505 of provisioning an electronic circuit can further include fabricating 1506 the electronic circuit further incorporating logic that incorporates an immutable value into the signed message such that the immutable value is selected from a group including a code signing public key, a hash of the code signing public key, and the like.

In some embodiments and/or applications, the method 1510 of provisioning an electronic circuit can further include acting 1511 in a trusted pre-production facility, generating 1512 a code signing key pair, and signing 1513 code using the private key from the code signing key pair. The method 1510 of provisioning the electronic circuit can further include using 1514 the electronic circuit to create a message signing private key and a matching message signing public key based on the at least one secret value, retaining 1515 the message signing public key, and operating 1516 a server that holds OEM sensitive data, verifies a signature over messages using the message signing public key, and sends OEM sensitive data to a production facility. In additional embodiments, the method 1520 of provisioning an electronic circuit can further include embedding 1521 an immutable value such as a code signing public key acting as a trust anchor into at least one instance of the electronic circuit, causing 1522 the electronic circuit to generate a message signing private key based on the immutable value and the at least one secret value, generating 1523 the message signing public key, and retaining 1524 the message signing public key. In still further embodiments, the method 1525 of provisioning an electronic circuit can further include maintaining 1526 an audit log that records messages, maintaining 1527 an audit log that records chip-unique identifiers from messages, and causing 1528 the electronic circuit to authenticate the pre-production facility.

In various embodiments and/or applications, the method 1530 of provisioning an electronic circuit can further include acting 1531 in an untrusted production facility, embedding 1532 a public key from a code signing key pair into individual instances of a fabricated electronic circuit, loading 1533 code signed by a private key from the code signing key pair into individual instances of a product incorporating the fabricated electronic circuit, and executing 1534 the signed code. Executing 1534 the signed code can include causing 1535 the electronic circuit to sign messages using the message signing private key generated within the electronic circuit, and sending 1536 the signed message to a server 1516 operated by the pre-production facility. In an additional embodiment, the method 1540 of provisioning an electronic circuit can further include receiving 1541 OEM sensitive data from a pre-production facility, and causing 1542 instances of the fabricated electronic circuit to sign a message that includes a chip-unique identifier for the individual instances of the fabricated electronic circuit.

Figure 16:
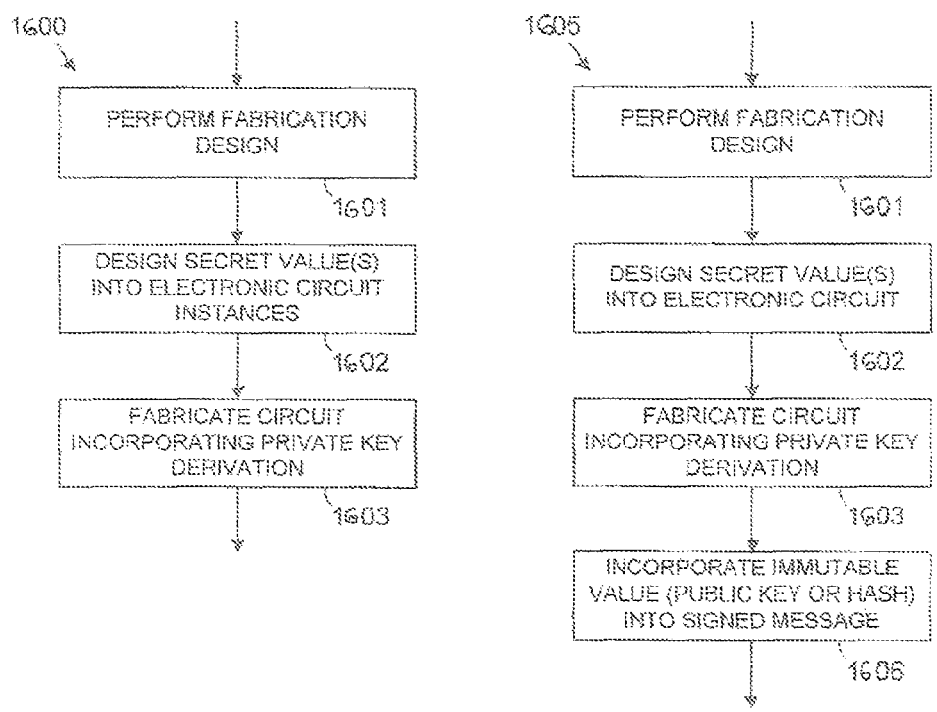
FIG. 16, including FIGS. 16.1 and 16.2, are schematic flow charts illustrating an embodiment or embodiments of a method of operating a production system in a potentially untrusted environment.

Referring to FIG. 16, including FIGS. 16.1 and 16.2, are schematic flow charts illustrating an embodiment or embodiments of a method of operating a production system in a potentially untrusted environment. An embodiment of a method 1600 of operating the production system can further include performing 1601 fabrication design, designing 1602 at least one secret value into the electronic circuit such that instances of the electronic circuit hold an identical secret value, and fabricating 1603 the electronic circuit incorporating logic that derives a message signing private key from the identical secret value, logic that generates a message signing public key that matches the message signing private key, logic that signs messages with the message signing private key. In a further embodiment, the method 1605 of operating the production system can further include fabricating 1606 the electronic circuit further incorporating logic that incorporates an immutable value into the signed message such that the immutable value can be selected from a code signing public key, a hash of the code signing public key, a chip-unique identifier, and the like.

In some embodiments and/or applications, the method 1610 of operating the production system can further include performing 1611 trusted pre-production, generating 1612 a code signing key pair, signing 1613 code using a private key from the code signing key pair, and using 1614 the electronic circuit to create a message signing private key and a matching message signing public key based on the at least one secret value. The method 1610 of operating the production system can further include retaining 1615 the message signing public key, and operating 1616 a server that holds OEM sensitive data, verifies a signature over messages using the message signing public key, and sends OEM sensitive data to a production facility. In additional embodiments, the method 1620 of operating the production system can further include embedding 1621 an immutable value into at least one instance of the electronic circuit, causing 1622 the electronic circuit to generate a message signing private key based on the immutable value which can be a trust anchor and the at least one secret value, generating 1623 the message signing public key, and retaining 1624 the message signing public key. In further embodiments, the method 1625 of operating the production system can further include maintaining 1626 an audit log that records messages, maintaining 1627 an audit log that records chip-unique identifiers from messages, and causing 1628 the electronic circuit to authenticate the pre-production facility.

In some embodiments and/or applications, the method 1630 of operating the production system can further include performing 1631 untrusted production, embedding 1632 a public key from a code signing key pair into individual instances of a fabricated electronic circuit as a trust anchor, embedding 1633 code signed by a private key from the code signing key pair into individual instances of a product incorporating the fabricated electronic circuit, and executing 1634 the signed code. Executing 1634 the signed code can include causing 1635 the electronic circuit to sign messages using the message signing private key generated within the electronic circuit, and sending 1636 the signed messages to the server 1616 operated by the pre-production facility. In other embodiments, the method of operating the production system can further include receiving OEM sensitive data from a pre-production facility, and causing instances of the fabricated electronic circuit to sign a message that includes a chip-unique identifier for the individual instances of the fabricated electronic circuit.

The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

While the principles of the disclosed system are described above in connection with specific apparatus, it is to be clearly understood that this description is made only by way of example and not as a limitation on scope of the appended claims. The illustrative pictorial diagrams depict structures and process actions in a secure communication process. Although the particular examples illustrate specific structures and process acts, many alternative implementations are possible and commonly made by simple design choice. Actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, components, configurations, and topologies are given by way of example only. The parameters, components, configurations, and topologies can be varied to achieve the desired structure as well as modifications, which are within the scope of the claims. Variations and modifications of the embodiments disclosed herein may also be made while remaining within the scope of the following claims.

What is claimed is:

1. A method performed by a first entity, a second entity, and a third entity, the method comprising:
    embedding, by the first entity, one or more secret values in first and second electronic circuits, wherein each of the first and second electronic circuits includes private key derivation logic, public key derivation logic, and secure boot code;
    generating, by the second entity, a code signing public key, a code signing private key, and a trust anchor derived from the code signing public key;
    embedding, by the second entity, the trust anchor in the first electronic circuit;
    activating, by the second entity, the secure boot code, wherein the secure boot code causes the private key derivation logic of the first electronic circuit to generate a message signing private key using a combination of the trust anchor and the one or more embedded secret values, causes the public key derivation logic of the first electronic circuit to generate a message signing public key that corresponds to the message signing private key, and stores the message signing private key in the first electronic circuit;
    signing, by the second entity, provisioning code using the code signing private key, resulting in signed provisioning code that includes the provisioning code and a signature;
    sending, by the second entity, the code signing public key, the trust anchor, and the signed provisioning code to the third entity;
    embedding, by the third entity, the trust anchor in the second electronic circuit;
    activating, by the third entity, the secure boot code in the second electronic circuit, wherein the secure boot code causes the private key derivation logic of the second electronic circuit to generate a message signing private key that is the same as the message signing private key generated by the first electronic circuit using a combination of the trust anchor and the one or more embedded secret values, stores the message signing private key in a protected register of the second electronic circuit, derives a value from the code signing public key, and compares the value derived from the code signing public key with the trust anchor embedded in the second electronic circuit, verifies the signature of the signed provisioning code using the code signing public key, and when the signature of the signed provisioning code is verified, launches the provisioning code on the second electronic circuit;
    receiving, by the provisioning code, a challenge message from the second entity;
    preparing, by the provisioning code, a signed response message that includes a concatenated message signed using the message signing private key, wherein the concatenated message includes the challenge message concatenated with a unique identifier of the second electronic circuit;
    sending, by the provisioning code, the signed response message to the second entity;
    determining, by the second entity, whether the unique identifier matches any previously-stored unique identifiers maintained by a first computer system in a log of electronic circuits that have been previously provisioned;
    when the unique identifier does not match a unique identifier in the log, receiving, by the second electronic circuit over a secure channel between the second entity and the second electronic circuit, sensitive provisioning information from the second entity;
    when the unique identifier matches a unique identifier in the log, the second entity refraining from providing the sensitive provisioning information to the second electronic circuit; and
    when the sensitive provisioning information is received, storing the sensitive provisioning information on the second electronic circuit.

2. The method of claim 1, wherein embedding the one or more secret values in the first electronic circuit comprises embedding one or more secret values selected from a value embedded in logic gates of the first electronic circuit, a value burned into a set of fuses of the first electronic circuit, and a value embedded in masked read only memory (ROM) of the first electronic circuit.

3. The method of claim 1, further comprising:
    embedding, by the first entity, the secure boot code in the first and second electronic circuits; and
    storing, by the first entity, unique identifiers in the first and second electronic circuits.

4. The method of claim 1, further comprising:
    providing, by the first entity, the first electronic circuit to the second entity; and
    providing, by the first entity, the second electronic circuit to the third entity.

5. The method of claim 1, wherein generating the trust anchor comprises generating a hash of the code signing public key.

6. The method of claim 1, wherein embedding the trust anchor comprises burning the trust anchor into a set of fuses of the first electronic circuit.

7. The method of claim 1, wherein storing the message signing private key comprises storing the message signing private key in protected registers of the first and second electronic circuits.

8. The method of claim 1, wherein code running on the first electronic circuit provides the message signing public key to the second entity.

9. A method performed by a first entity, a second entity, and a third entity, the method comprising:
embedding, by the first entity, one or more secret values in first and second electronic circuits, wherein each of the first and second electronic circuits includes private key derivation logic, public key derivation logic, and secure boot code;
generating, by the second entity, a code signing public key, a code signing private key, and a trust anchor derived from the code signing public key;
embedding, by the second entity, the trust anchor in the first electronic circuit;
activating, by the second entity, the secure boot code, wherein the secure boot code causes the private key derivation logic of the first electronic circuit to generate a message signing private key using a combination of the trust anchor and the one or more embedded secret values, causes the public key derivation logic of the first electronic circuit to generate a message signing public key that corresponds to the message signing private key, and stores the message signing private key in the first electronic circuit;
signing, by the second entity, provisioning code using the code signing private key, resulting in signed provisioning code that includes the provisioning code and a signature;
sending, by the second entity, the code signing public key, the trust anchor, and the signed provisioning code to the third entity;
embedding, by the third entity, the trust anchor in the second electronic circuit;
activating, by the third entity, the secure boot code in the second electronic circuit, wherein the secure boot code causes the private key derivation logic of the second electronic circuit to generate a message signing private key that is the same as the message signing private key generated by the first electronic circuit using a combination of the trust anchor and the one or more embedded secret values, stores the message signing private key in a protected register of the second electronic circuit, derives a value from the code signing public key, and compares the value derived from the code signing public key with the trust anchor embedded in the second electronic circuit, verifies the signature of the signed provisioning code using the code signing public key, and when the signature of the signed provisioning code is verified, launches the provisioning code on the second electronic circuit;
receiving, by the provisioning code, a challenge message from the second entity;
preparing, by the provisioning code, a signed response message that includes the challenge message signed using the message signing private key;
sending, by the provisioning code, the signed response message to the second entity;
determining, by the second entity, whether a maximum number of electronic circuits have been previously provisioned;
when the maximum number of electronic circuits have been previously provisioned, the second entity refraining from providing the sensitive provisioning information to the second electronic circuit;
when the maximum number of electronic circuits have not been previously provisioned, receiving, by the second electronic circuit over a secure channel between the second entity and the second electronic circuit, sensitive provisioning information from the second entity; and
when the sensitive provisioning information is received, storing the sensitive provisioning information on the second electronic circuit.

10. A method performed by a first entity and a first computer system associated with the first entity, the method comprising the steps of:
generating a code signing public key and a code signing private key;
generating a trust anchor based on the code signing public key;
signing provisioning code using the code signing private key, resulting in signed provisioning code that includes the provisioning code and a signature;
embedding the trust anchor in a first electronic circuit, wherein the first electronic circuit includes private key derivation logic, public key derivation logic, secure boot code, and one or more embedded secret values;
activating the secure boot code, wherein the secure boot code causes the private key derivation logic to generate a message signing private key using a combination of the trust anchor and the one or more embedded secret values, causes the public key derivation logic of the first electronic circuit to generate a message signing public key that corresponds to the message signing private key, and stores the message signing private key in the first electronic circuit;
sending a challenge message to a second electronic circuit that is connected to a second computer system associated with a second entity;
receiving, from a second electronic circuit, a signed response message generated by the second electronic circuit, wherein the signed response message includes a concatenated message signed using a message signing private key that was generated using the trust anchor and the one or more embedded secret values, which also are stored in the second electronic circuit, wherein the concatenated message includes the challenge message concatenated with a unique identifier of the second electronic circuit, and wherein the message signing private key used by the second electronic circuit is the same as the message signing private key generated by the first electronic circuit;
verifying, by the first computer system, the signed response message using a message signing public key that was derived from the message signing private key;
determining, by the first computer system, whether the unique identifier matches any previously-stored unique identifiers maintained by the first computer system in a log of electronic circuits that have been previously provisioned; and when the unique identifier matches a unique identifier in the log, the first computer system refraining from downloading sensitive provisioning information to the second electronic circuit.

11. The method of claim 10, wherein the one or more secret values are selected from a value embedded in logic gates of the first electronic circuit, a value burned into a set of fuses of the first electronic circuit, and a value embedded in masked read only memory (ROM) of the first electronic circuit.

12. The method of claim 10, wherein generating the trust anchor comprises generating a hash of the code signing public key.

13. The method of claim 10, wherein embedding the trust anchor comprises burning the trust anchor into a set of fuses of the first electronic circuit.

14. The method of claim 10, further comprising:
providing, by the first electronic circuit, the message signing public key to the first computer system;
sending, by the first entity, the code signing public key, the trust anchor, and the signed provisioning code to a second entity;
when the signed response message is verified, the first computer system downloading the sensitive provisioning information to the second electronic device over a secure channel between the first computer system and the second computer system; and
when the signed response message is not verified, the first computer system refraining from downloading the sensitive provisioning information to the second electronic device.

15. A method performed by a first entity and a first computer system associated with the first entity, the method comprising the steps of:
generating a code signing public key and a code signing private key;
generating a trust anchor based on the code signing public key;
signing provisioning code using the code signing private key, resulting in signed provisioning code that includes the provisioning code and a signature;
embedding the trust anchor in a first electronic circuit, wherein the first electronic circuit includes private key derivation logic, public key derivation logic, secure boot code, and one or more embedded secret values;
activating the secure boot code, wherein the secure boot code causes the private key derivation logic to generate a message signing private key using a combination of the trust anchor and the one or more embedded secret values, causes the public key derivation logic of the first electronic circuit to generate a message signing public key that corresponds to the message signing private key, and stores the message signing private key in the first electronic circuit;
sending a challenge message to a second electronic circuit that is connected to a second computer system associated with a second entity;
receiving, from a second electronic circuit, a signed response message generated by the second electronic circuit, wherein the signed response message was generated using a message signing private key that was generated using the trust anchor and the one or more embedded secret values, which also are stored in the second electronic circuit, wherein the message signing private key used by the second electronic circuit is the same as the message signing private key generated by the first electronic circuit;
verifying, by the first computer system, the signed response message using a message signing public key that was derived from the message signing private key;
determining, by the first computer system, whether a maximum number of electronic circuits have been previously provisioned; and
when the maximum number of electronic circuits have been previously provisioned, the first computer system refraining from downloading sensitive provisioning information to the second electronic circuit.

16. A method performed by a first entity and a first computer system associated with the first entity, the method comprising the steps of:
receiving, from a second entity, a code signing public key, a trust anchor derived from the code signing public key, and signed provisioning code that includes provisioning code and a signature;
embedding the trust anchor in a first electronic circuit that includes private key derivation logic, public key derivation logic, secure boot code, and one or more embedded secret values;
activating the secure boot code, wherein the secure boot code causes the private key derivation logic to generate a message signing private key using a combination of the trust anchor and the one or more embedded secret values, stores the message signing private key in the first electronic circuit, derives a value from the code signing public key, compares the value derived from the code signing public key with the trust anchor embedded in the electronic circuit, and verifies the signature of the signed provisioning code using the code signing public key;
receiving a challenge message from a second computer system associated with a second entity, wherein the second computer system has a message signing public key that was generated by a second electronic circuit, wherein the message signing public key was generated by the second electronic circuit using a message signing private key that was generated using the trust anchor and the one or more embedded secret values, which also are stored in the second electronic circuit, wherein the message signing private key used by the second electronic circuit is the same as the message signing private key generated by the first electronic circuit;
preparing, by the provisioning code, a signed response message that includes a concatenated message signed using the message signing private key, wherein the concatenated message includes the challenge message concatenated with a unique identifier of the first electronic circuit;
sending the signed response message to the second computer system;
receiving, by the first electronic circuit, sensitive provisioning information from the second computer system when the second computer system is able to verify the signed response message using the message signing public key, and the second computer system is able to determine that the unique identifier does not match any previously-stored unique identifiers maintained by a second computer system in a log of electronic circuits that have been previously provisioned; and
storing the sensitive provisioning information on the first electronic circuit.

17. The method of claim 16, wherein the one or more secret values are selected from a value embedded in logic gates of the first electronic circuit, a value burned into a set of fuses of the first electronic circuit, and a value embedded in masked random access memory of the first electronic circuit.

18. The method of claim 16, wherein embedding the trust anchor comprises burning the trust anchor into a set of fuses of the first electronic circuit.

19. The method of claim 16, further comprising:
storing the sensitive provisioning information on the first electronic circuit.

20. A method performed by a first entity and a first computer system associated with the first entity, the method comprising the steps of:
receiving, from a second entity, a code signing public key, a trust anchor derived from the code signing public key, and signed provisioning code that includes provisioning code and a signature;
embedding the trust anchor in a first electronic circuit that includes private key derivation logic, public key derivation logic, secure boot code, and one or more embedded secret values;
activating the secure boot code, wherein the secure boot code causes the private key derivation logic to generate a message signing private key using a combination of the trust anchor and the one or more embedded secret values, stores the message signing private key in the first electronic circuit, derives a value from the code signing public key, compares the value derived from the code signing public key with the trust anchor embedded in the electronic circuit, and verifies the signature of the signed provisioning code using the code signing public key;
receiving a challenge message from a second computer system associated with a second entity, wherein the second computer system has a message signing public key that was generated by a second electronic circuit, wherein the message signing public key was generated by the second electronic circuit using a message signing private key that was generated using the trust anchor and the one or more embedded secret values, which also are stored in the second electronic circuit, wherein the message signing private key used by the second electronic circuit is the same as the message signing private key generated by the first electronic circuit;
preparing, by the provisioning code, a signed response message that includes the challenge message signed using the message signing private key;
sending the signed response message to the second computer system;
receiving, by the first electronic circuit, sensitive provisioning information from the second computer system when the second computer system is able to verify the signed response message using the message signing public key, and the second computer system is able to determine that a maximum number of electronic circuits have not been previously provisioned; and
storing the sensitive provisioning information on the first electronic circuit.

* * * * *